US010976174B2

(12) United States Patent
Miyake et al.

(10) Patent No.: US 10,976,174 B2
(45) Date of Patent: Apr. 13, 2021

(54) INVESTIGATION ASSIST SYSTEM AND INVESTIGATION ASSIST METHOD

(71) Applicant: Panasonic i-PRO Sensing Solutions Co., Ltd., Fukuoka (JP)

(72) Inventors: Yuumi Miyake, Fukuoka (JP);
Takahiro Yoshimura, Fukuoka (JP);
Kazuya Ozawa, Fukuoka (JP);
Takamitsu Arai, Fukuoka (JP);
Takeshi Wakako, Fukuoka (JP)

(73) Assignee: Panasonic I-PRO Sensing Solutions Co., Ltd., Fukuoka (JP)

( * ) Notice: Subject to any disclaimer, the term of this patent is extended or adjusted under 35 U.S.C. 154(b) by 165 days.

(21) Appl. No.: 16/165,632

(22) Filed: Oct. 19, 2018

(65) Prior Publication Data

US 2019/0120650 A1 Apr. 25, 2019

(30) Foreign Application Priority Data

Oct. 20, 2017 (JP) .............................. JP2017-203930
Feb. 19, 2018 (JP) .............................. JP2018-027359
Feb. 19, 2018 (JP) .............................. JP2018-027360

(51) Int. Cl.
*G08G 1/00* (2006.01)
*G01C 21/36* (2006.01)
*G06K 9/00* (2006.01)
*H04N 7/18* (2006.01)
*G06T 19/00* (2011.01)

(52) U.S. Cl.
CPC ..... *G01C 21/3632* (2013.01); *G06K 9/00785* (2013.01); *G06T 19/006* (2013.01); *H04N 7/18* (2013.01); *H04N 7/181* (2013.01); *G08G 1/00* (2013.01)

(58) Field of Classification Search
CPC ............ G01C 21/3632; G06K 9/00785; G06T 19/006; H04N 7/181; H04N 7/18; G08G 1/00
USPC ......................................................... 701/533
See application file for complete search history.

(56) References Cited

U.S. PATENT DOCUMENTS 5,801,943 A 9/1998 Nasburg
2006/0092043 A1* 5/2006 Lagassey ............. G07C 5/0891
340/907

FOREIGN PATENT DOCUMENTS

JP 2007-174016 A 7/2002
WO 2015/185009 A1 12/2015

* cited by examiner

*Primary Examiner* — James M McPherson
*Assistant Examiner* — Tiffany P Ohman
(74) *Attorney, Agent, or Firm* — Seed IP Law Group LLP

(57) ABSTRACT

An investigation assist device includes a processor and a storage that records information on a road map including a plurality of intersections and captured videos of a plurality of cameras in correlation with a capturing time, camera information, and intersection information. The processor retrieves at least one vehicle satisfying a retrieval condition and extracts a traveling direction of the vehicle when passing through each of the plurality of intersections based on the captured videos of the plurality of cameras in response to a designation of the retrieval condition including information on time when an incident occurs and feature information on a vehicle causing the incident. The processor superimposes a traveling route of the vehicle on the road map based on the traveling direction extracted for each of the intersections and outputs the traveling route to an output unit.

9 Claims, 23 Drawing Sheets

FIG. 13

TBL1

| ID | INTERSECTION | DATE AND TIME | VEHICLE COLOR | VEHICLE STYLE | TRAVELING DIRECTION | PASSING SPEED |
|---|---|---|---|---|---|---|
| 1101 | As1 | 2018. 2.12, 21:00 | RED | SEDAN, TWO-DOOR | FROM SOUTH TO EAST | 70km/h |
| 1102 | Bs1 | 2018. 2.13, 17:00 | WHITE | WAGEN, FOUR-DOOR | FROM NORTH TO SOUTH | 30km/h |
| 1103 | Cs1 | 2018. 2.14, 19:00 | BLUE | SEDAN, TWO-DOOR | FROM WEST TO EAST | 60km/h |
| ⋮ | ⋮ | ⋮ | ⋮ | ⋮ | ⋮ | ⋮ |

INVESTIGATION ASSIST SYSTEM AND INVESTIGATION ASSIST METHOD

BACKGROUND OF THE INVENTION

1 Field of the Invention

The present disclosure relates to an investigation assist system and an investigation assist method which can assist to search a route of a getaway vehicle of a suspect or criminal of an accident or incident, using videos captured by a plurality of cameras.

2 Description of the Related Art

In the related art, a technique is known in which a plurality of cameras are disposed at predetermined locations on a traveling route of a vehicle, and camera image information captured by the respective cameras is displayed on a display device in a terminal device mounted in the vehicle through a network and wireless information exchange device. According to JP-A-2007-174016, a user can obtain a real-time camera image with a large information amount, based on the camera image information captured by the plurality of cameras disposed on the traveling route of the vehicle.

In JP-A-2007-174016, however, when an incident or accident (hereinafter, referred to as "incident") occurs in the traveling route (for example, an intersection where many people and vehicles come and go) of the vehicles, it is not considered to visually present an escape route or an escape direction of the vehicle causing the incident to the user. When the incident occurs, it is important for the initial investigation of the police to grasp the way of getaway vehicles at an early stage. However, according to the prior art so far, captured videos or eyewitness information on the cameras installed at intersections are collected, the policeman relies on these captured videos or the eyewitness information to create artificially the escape route of the target getaway vehicle. For this reason, the policeman has a problem that it takes time to grasp the escape route of the getaway vehicle. Therefore, even if the prior techniques including JP-A-2007-174016 are used, it is difficult to early create the escape route of the getaway vehicle or to present visually the escape route on the map when the above-described incident occurs.

SUMMARY OF THE INVENTION

The present disclosure has been made in view of the above problems, and an object thereof is to provide an investigation assist system and an investigation assist method which can effectively assist creation of an escape route of a getaway vehicle in an early stage, visually present the escape route to the operator, and grasp the escape route in an early stage, when an incident occurs around an intersection where many people and vehicles come and go.

The present disclosure provides an investigation assist system including a plurality of cameras that are installed at a plurality of intersections respectively and an investigation assist device that is connected communicably with the plurality of cameras. The investigation assist device includes a processor and a storage that records information on a road map including the plurality of intersections and captured videos of the cameras in correlation with a capturing time, camera information, and intersection information. The processor retrieves at least one vehicle satisfying a retrieval condition and extracts a traveling direction of the vehicle for each of the intersections at the time of passing through each of the plurality of intersections based on the captured videos of the plurality of cameras in response to a designation of the retrieval condition including information on time when an incident occurs and feature information on a vehicle causing the incident. The processor superimposes a traveling route of the vehicle on the road map based on the traveling direction extracted for each of the intersections and outputs the traveling route on the road map to an output unit.

According to the present disclosure, it is possible to can effectively assist creation of an escape route of a getaway vehicle in an early stage, visually present the escape route to the operator, and grasp the escape route in an early stage, when an incident occurs around an intersection where many people and vehicles come and go.

BRIEF DESCRIPTION OF THE DRAWINGS

FIG. 13 is a view illustrating an example of a vehicle information table registered in a storage unit;

DESCRIPTION OF THE PREFERRED EMBODIMENTS

Hereafter, embodiments will be described in detail in which an investigation assist system and an investigation assist method are specifically disclosed, with reference to the accompanying drawings. However, more detailed descriptions than needed may be omitted. For example, the detailed descriptions of known elements or the duplicated descriptions of substantially the same components may be omitted. This is in order to not only avoid unnecessary redundancy of the following descriptions, but also promote understanding of those skilled in the art. The accompanying drawings and the following descriptions are provided to make a person skilled in the art to understand the present disclosure, and the subjects of descriptions in claims are not limited by the drawings and descriptions.

In the following embodiments, a use case will be exemplified in which when an incident (incident or accident) occurred at an intersection where vehicles come and go (for example, an intersection where many people or vehicles come and go), the system assists an investigation of a policeman by creating the whereabouts (in other words, escape routes) of the getaway vehicle of a suspect or criminal in real time after the incident occurred and presenting visually it to an operator (for example, a policeman) in a police station, thereby effectively assisting the effectiveness of policeman's initial investigation. In the description of each of the following screens, the east, west, south, and north of a road map shown in the screen correspond to right side, the left side, the lower side, and the upper side of the page of the road map in the corresponding drawing.

First Embodiment

Figure 1:
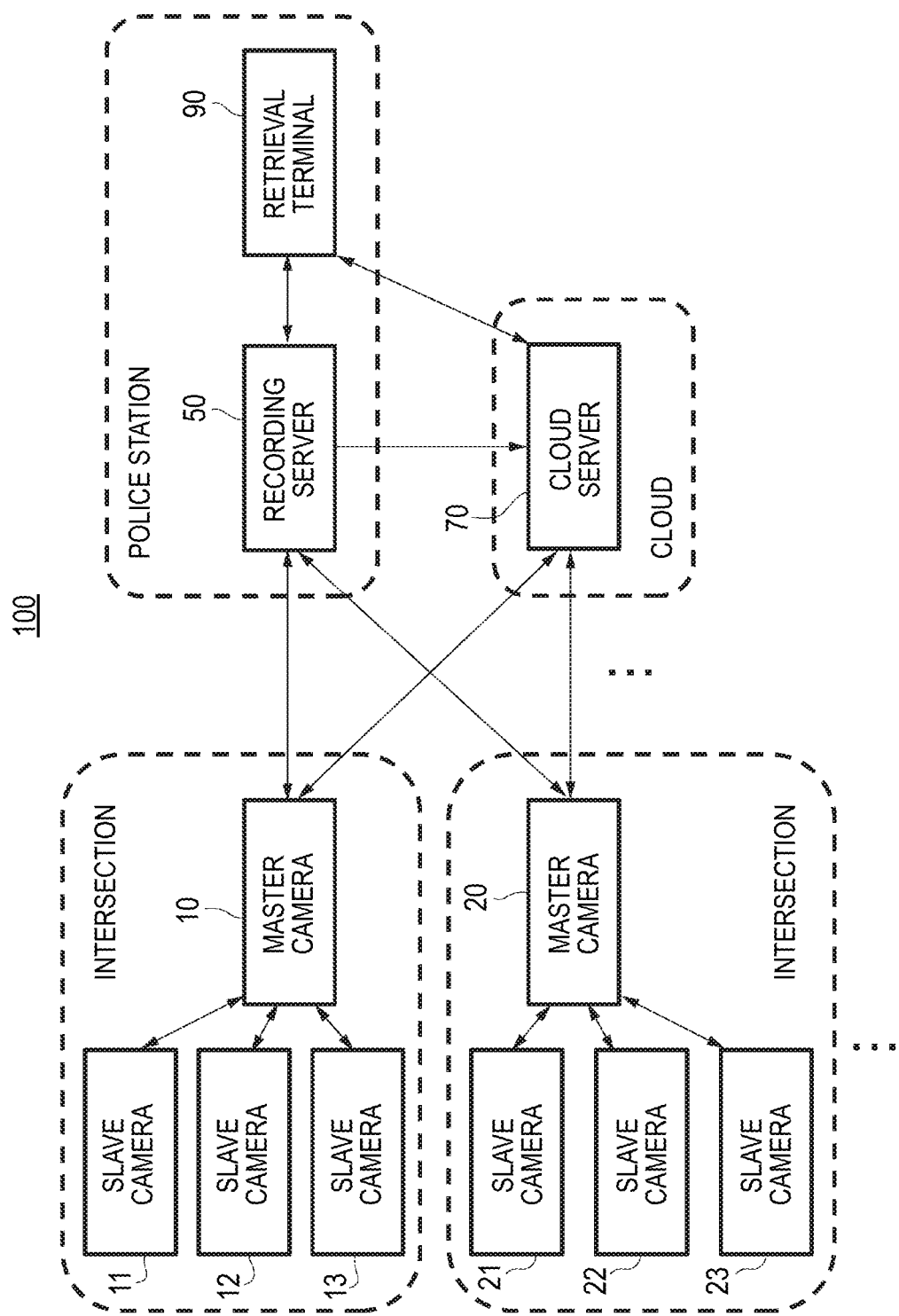
FIG. 1 is a block diagram illustrating a configuration example of an investigation assist system according to a first embodiment.
Figure 2:
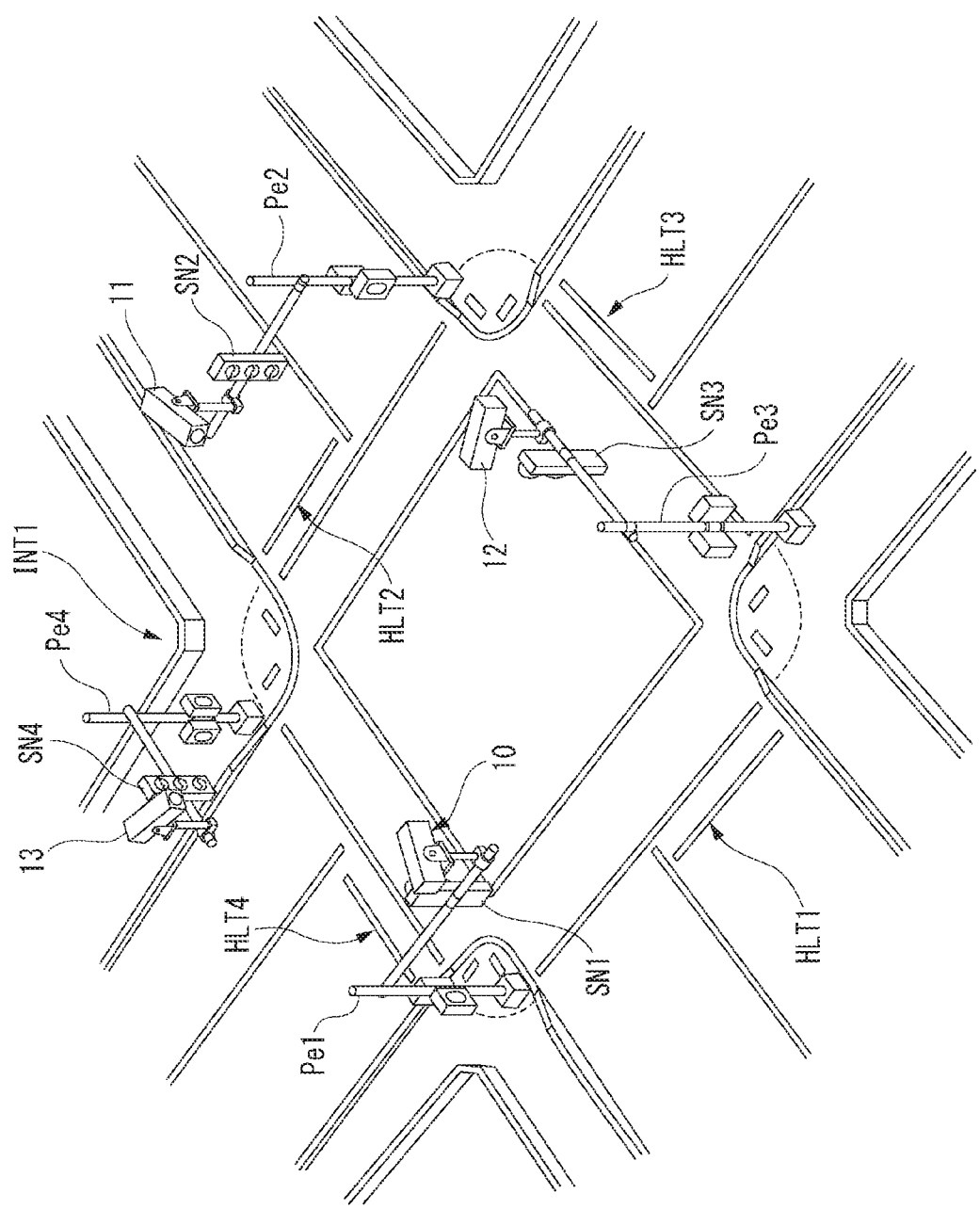
FIG. 2 is a view illustrating an example of an installation layout of one or more cameras at intersections.

FIG. 1 is a block diagram illustrating a configuration example of an investigation assist system 100 according to a first embodiment. FIG. 2 is a view illustrating an example of an installation layout of one or more cameras at an intersection INT1. The investigation assist system 100 includes a plurality of cameras installed at each intersection, a recording server 50 and a retrieval terminal 90 installed in a police station, and a cloud server 70 present on the cloud. In the following description, the cloud server 70 may be read as an on-premises server (so-called on-premises form) installed in a police station.

In the investigation assist system 100, a plurality of cameras (for example, cameras 10 to 13) constitute one segment and are installed at each intersection. In the plurality of cameras in one segment, any one camera (for example, the camera 10) serves as a master camera, and the other cameras (for example, the cameras 11 to 13) serve as slave cameras. The master camera can communicate with the plurality of slave cameras connected to the master camera, and communicate with the recording server 50 or the cloud server 70. The slave cameras can communicate with the master camera connected to the slave cameras. FIG. 1 illustrates that the plurality of cameras are installed at the intersection (one segment), but only one master camera may be installed. Furthermore, only a plurality of master cameras may be installed at the intersection without slave cameras.

The cameras 11 to 13 and 21 to 23 serving as slave cameras are monitoring cameras which can capture subjects at view angles which were respectively set when the cameras were installed (for example, videos showing the situations at the intersections), and transmit the captured videos to the cameras 10 and 20 serving the master cameras. Each of the captured videos may include not only data of the captured video, but also identification information on the camera having captured the video (an example of camera information), and the same applies hereafter.

The cameras 10 and 20 serving as the master cameras receive the captured videos transmitted by the cameras 11 to 13 and 21 to 23 serving as the slave cameras connected to the cameras, respectively. The cameras 10 and 20 are monitoring cameras which can capture subjects at view angles set when the master cameras were installed (for example, videos showing the situations at the intersections). The cameras 10 and 20 correlate the captured videos thereof with the captured videos transmitted from the slave cameras, and transmit the videos to the recording server 50 or the cloud server 70.

The cameras 10 to 13 are installed to capture the intersection INT1 as illustrated in FIG. 2. The cameras 10 and 11 are installed to substantially face each other. Similarly, the cameras 12 and 13 are installed to substantially face each other. In FIG. 2, a plurality of cameras 10 to 13 are installed at one intersection INT1, but one camera (for example, camera 10), two cameras (for example, cameras 10 and 11), three cameras (for example, cameras 10, 11, and 12), or five or more cameras may be installed.

The camera 10 is installed on an assist bar mounted perpendicular to a pole Pe1 erected in the vertical direction, and disposed adjacent to a traffic signal SN1. The center of the view angle of the camera 10 is set to the central portion of the intersection INT1, and a stop line HLT2 around the central portion of the intersection INT1 and a predetermined area around the stop line HLT2 are included in the view angle. Therefore, the camera 10 can capture videos of subjects within the set view angle.

The camera 11 is installed on an assist bar mounted perpendicular to a pole Pe2 erected in the vertical direction, and disposed adjacent to a traffic signal SN2. The center of the view angle of the camera 11 is set to the central portion of the intersection INT1, and a stop line HLT1 around the central portion of the intersection INT1 and a predetermined area around the stop line HLT1 are included in the view angle of the camera 11. Therefore, the camera 11 can capture videos of subjects within the set view angle.

The camera 12 is installed on an assist bar mounted perpendicular to a pole Pe3 erected in the vertical direction, and disposed adjacent to a traffic signal SN3. The center of the view angle of the camera 12 is set to the central portion of the intersection INT1, and a stop line HLT4 around the central portion of intersection INT1 and a predetermined area around the stop line HLT4 are included in the view angle of the camera 12. Therefore, the camera 12 can capture videos of subjects within the set view angle.

The camera 13 is installed on an assist bar mounted perpendicular to a pole Pe4 erected in the vertical direction, and disposed adjacent to a traffic signal SN4. The center of the view angle of the camera 13 is set to the central portion of the intersection INT1, and a stop line HLT3 around the central portion of the intersection INT1 and a predetermined area around the stop line HLT3 are included in the view angle of the camera 13. Therefore, the camera 13 can capture videos of subjects within the set view angle.

The cameras 20 to 23 illustrated in FIG. 1 may also be installed at an intersection in the same manner as the cameras 10 to 13. The cameras 10 to 13 and 20 to 23 are not limited to the installation layout illustrated in FIG. 2. For example, each of the cameras may be installed in such a manner that the optical axis of the lens thereof faces the optical axis of the lens of the corresponding camera installed in the diagonal direction. Specifically, the installation layout shows that the cameras are installed at end areas of sidewalks which lead to an intersection, and mounted on poles erected in the vertical direction with respect to the ground surface.

Figure 4:
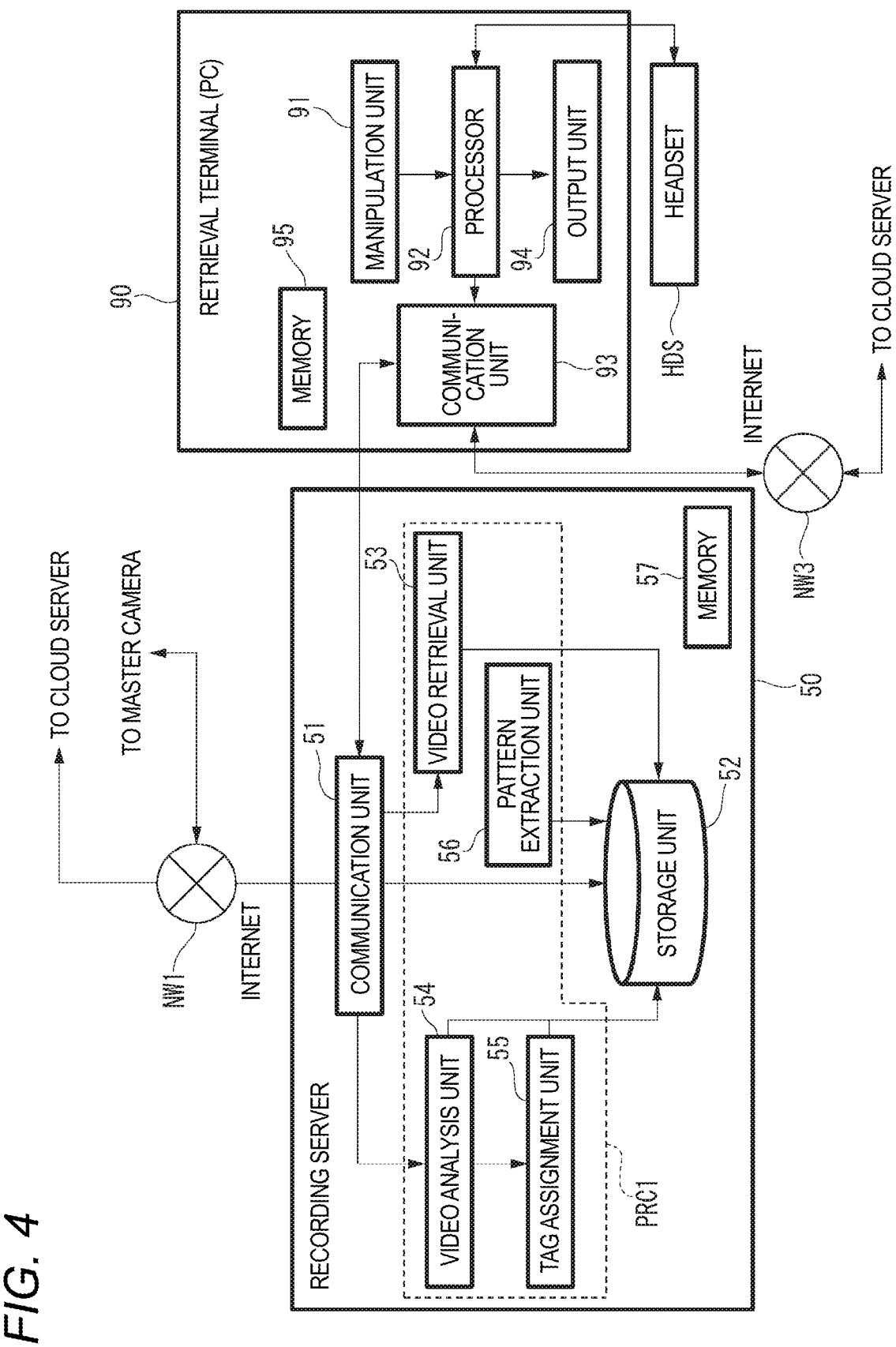
FIG. 4 is a block diagram illustrating an example of internal configurations of a recording server and a retrieval terminal according to the first embodiment.

The recording server 50 (an example of the investigation assist device) is installed in a police station, receives captured videos transmitted from cameras installed at intersections under the jurisdiction of the police station (for example, master cameras), and stores the received videos in a storage unit 52 (refer to FIG. 4). The stored videos are analyzed by the recording server 50 based on a request (instruction) from a retrieval terminal 90, when an event (a matter or a happening) such as an incident occurred, and used for acquiring detailed information on the incident. The recording server 50 may transmit (upload) a part of the captured videos to the cloud server 70 in order to back up the captured videos. The part of the captured videos may include captured videos designated by an operation of a terminal (not illustrated) used by a manager in a police state, for example, captured videos for an important or serious event. The recording server 50 analyzes the received videos, acquires tag information, correlates the acquired tag information with the analyzed videos, and stores the resultant videos in the storage unit 52. The tag information may indicate information on the face of a person and the type, style, or color of a vehicle in the captured videos. The recording server 50 may detect an occurrence of an event such as an incident at or around the intersection through the analysis of the captured videos.

The retrieval terminal 90 (an example of the investigation assist device) is installed in the police station, and used by an official in the police station (that is, an operator or policeman using the retrieval terminal 90). For example, the retrieval terminal 90 may include a laptop or notebook PC (Personal Computer). When an incident or accident occurred, the operator receives a call (incoming call) from a person (a so-called reporter) who reported the occurrence of the incident to the police station, makes an inquiry about detailed information on the incident or accident from the reporter, and correctly records various pieces of information acquired through the inquiry as data. The retrieval terminal 90 is not limited to the above-described PC, but may include a computer with a communication function, such as a smart phone, tablet terminal and PDA (Personal Digital Assistant). The retrieval terminal 90 requests (instructs) the recording server 50 or the cloud server 70 to retrieve or analyze the captured videos stored in the recording server 50 or the cloud server 70, and displays the retrieval result or analysis result on an output unit 94 (refer to FIG. 4).

The cloud server 70 (an example of an investigation assist device) is provided on a network such as a cloud, receives captured videos transmitted from the recording server 50 or cameras installed at intersections under the jurisdiction of police stations (specifically, master cameras), and stores the received videos in the storage unit 72 (refer to FIG. 4). The stored captured videos are analyzed by the cloud server 70 based on a request (instruction) from the retrieval terminal 90 when an event (matter or happening) such as an incident occurred, and used for acquiring detailed information on the incident. The cloud server 70 analyzes the received videos, acquires tag information, correlates the acquired tag information with the analyzed videos, and stores the resultant videos in the storage unit 72. The tag information may indicate information on the faces of people and the types, styles, or colors of vehicles in the captured videos. The cloud server 70 may detect an occurrence of an event such as an incident at or around an intersection through the analysis of the captured videos.

FIG. 1 illustrates that only one recording server 50 and one retrieval terminal 90 are provided in the police station, but a plurality of recording servers 50 and retrieval terminals 90 may be provided. Moreover, a plurality of police stations may be included in the investigation assist system 100. Similarly, FIG. 1 illustrates that only one cloud server 70 is provided on the cloud, but a plurality of cloud servers may be provided.

Figure 3:
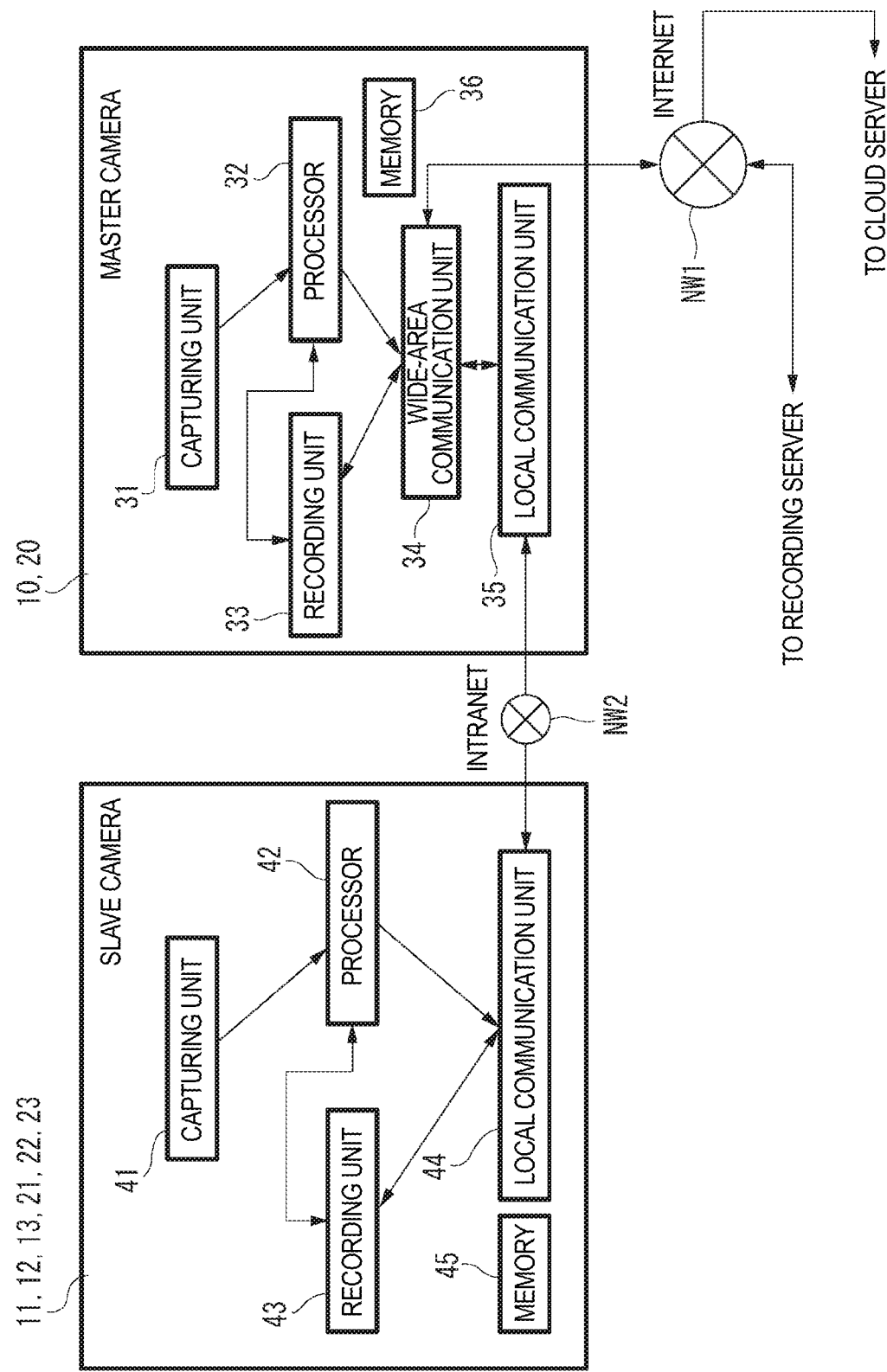
FIG. 3 is a block diagram illustrating an example of internal configurations of a master camera and a slave camera according to the first embodiment.

FIG. 3 is a block diagram illustrating internal configurations of the master camera and the slave camera according to the first embodiment. The cameras 11 to 13 corresponding to the slave cameras and the camera 10 corresponding to the master camera may be connected through a wired LAN (Local Area Network) such as an Intranet NW2, and connected through a local wireless network (for example, a wireless LAN or WiGig (registered trademark)).

Each of the cameras 11 to 13 and 21 to 23 corresponding to the slave cameras includes a capturing unit 41, a processor 42, a recording unit 43 and a local communication unit 44. In order to simplify the descriptions of the slave cameras, the camera 11 will be representatively exemplified. In FIG. 3, however, the camera 11 may be replaced with any one of the cameras 12, 13, 21, 22 and 23.

The capturing unit 41 includes a condenser lens and a solid state imaging device such as a CCD (Charge Coupled Device) image sensor or CMOS (Complementary Metal Oxide Semiconductor) image sensor. The capturing unit 41 outputs data of a captured video for subjects to the processor 42 at all times while the camera 11 is powered on, the captured video being acquired through a capturing operation of the solid state imaging device. The capturing unit 41 may include a mechanism (for example, a pan tilt zoom mechanism) for changing the capturing direction or zoom magnification of the camera.

The processor 42 is configured using a CPU (Central Processing Unit), MPU (Micro Processing Unit), DSP (Digital Signal Processor) or FPGA (Field-Programmable Gate Array).

The processor 42 functions as a control unit of the camera 11, and performs a control process for controlling overall operations of the respective units of the camera 11, a data input/output process among the respective units of the camera 11, a data calculation process and a data storage process. The processor 42 operates according to a program and data stored in the memory 45. The processor 42 uses the memory 45 during operation, acquires the current time information, subjects the data of the video captured by the capturing unit 41 to various known image processing, and then records (stores) the data in the recording unit 43. Although not illustrated in FIG. 3, the camera 11 may include a GPS (Global Positioning System) receiver. In this case, the camera 11 may acquire the current position information from the GPS receiver, correlate the data of the captured video with the position information, and record the resultant data.

The GPS receiver will be briefly described. The GPS receiver receives satellite signals from a plurality of GPS signal transmitters (for examples, four navigation satellites), the satellite signals including the signal transmission times and position coordinates of the GPS signal transmitters. The GPS receiver calculates the current position coordinate of the master camera or slave camera based on the plurality of satellite signals and the reception times of the satellite signals. The calculation may be not performed by the GPS receiver, but performed by the processor 32 or 42 to which an output of the GPS receiver is input. The reception time information may be used for correcting the system time of the master camera or slave camera. The system time is used for recording the capturing times of images constituting a captured video, for example.

The processor 42 may control the capturing condition of the capturing unit 41 according to a control command from outside, received by the local communication unit 44. For example, when the control command from outside commands the processor to change a capturing direction, the processor 42 changes the capturing direction during a capturing operation of the capturing unit 41, according to the control command. For example, when the control command from outside commands the processor 42 to change the zoom magnification, the processor 42 changes the zoom magnification during a capturing operation of the capturing unit 41, according to the control command. For example, when the control command from outside commands the processor 42 to perform a tracking process for the designated subject, the processor 42 tracks the designated subject using the captured video data recorded in the recording unit 43, according to the control command. When various kinds of control commands are acquired by the processor 42, the processor 42 may perform processes corresponding to the respective control commands.

The processor 42 repeatedly transmits the captured video data recorded in the recording unit 43 to the master camera (for example, the camera 10) through the local communication unit 44. The repeated transmission is not limited to transmitting data whenever a predetermined period of time elapses, but may include transmitting data whenever an irregular time interval elapses, and transmitting data over a plurality of times. Hereafter, the same applies.

The recording unit 43 may include a semiconductor memory embedded in the camera 11 (for example, flash memory) or an external memory medium such as a memory card (for example, SD card), which is not embedded in the camera 11. The recording unit 43 correlates the data of the captured video generated by the processor 42 with the identification information on the camera 11 (an example of camera information) or the date and time information during capturing, and records the resultant data. The recording unit 43 normally pre-buffers and stores data of a video captured for a predetermined time (for example, 30 seconds), and continuously stores while overwriting data of a video captured for a predetermined time (for example, 30 seconds) before the current time. When the recording unit 43 is configured as a memory card, the recording unit 43 may be freely inserted into and removed from the casing of the camera 11.

The local communication unit 44 is configured using a communication circuit. The local communication unit 44 transmits the data of the captured video recorded in the recording unit 43 to the master camera (for example, the camera 10), based on an instruction of the processor 42, through short range wireless communication.

The memory 45 is configured using a RAM (Random Access Memory) and ROM (Read Only Memory), for example, and temporarily stores a program or data required for performing an operation of the camera 11 and information or data generated during the operation of the camera 11. The RAM is a work memory used during an operation of the processor 42, for example. The ROM stores a program and data for controlling the processor 42 in advance. The memory 45 stores identification information for identifying the camera 11 (for example, serial number) and various pieces of setting information.

The camera 10 corresponding to the master camera includes a capturing unit 31, a processor 32, a recording unit 33, a wide-area communication unit 34, a local communication unit 35 and a memory 36. In order to simplify the descriptions of the master cameras, the camera 10 will be representatively exemplified. In FIG. 3, however, the camera 10 may be replaced with the camera 20.

The capturing unit 31 includes a condenser lens and a solid state imaging device such as a CCD image sensor or CMOS image sensor. The capturing unit 31 outputs data of a captured video of subjects to the processor 32 at all times while the camera 10 is powered on, the captured video being acquired through a capturing operation by the solid state imaging device. The capturing unit 31 may include a mechanism (for example, a pan tilt zoom mechanism) for changing the capturing direction or zoom magnification of the camera.

The processor 32 is configured using a CPU, MPU, DSP or FPGA, for example. The processor 32 functions as a control unit of the camera 10, and performs a control process for controlling overall operations of the respective units of the camera 10, a data input/output process among the respective units of the camera 10, a data calculation process and a data storage process. The processor 32 operates according to a program and data stored in the memory 36. The processor 32 uses the memory 36 during operation, acquires the current time information, or records data of a video captured by the capturing unit 31 or data of captured videos transmitted from the slave cameras (for example, cameras 11 to 13) into the recording unit 33. Although not illustrated in FIG. 3, the camera 10 may have a GPS receiver. In this case, the camera 10 may acquire the current position information from the GPS receiver, and the position information may be further recorded in correlation with the data of the captured video captured by the camera 10.

The processor 32 may control the capturing condition of the capturing unit 31 according to a control command from outside, received by the local communication unit 35. For example, when the control command from outside commands the processor 32 to change a capturing direction, the processor 32 changes the capturing direction during a capturing operation of the capturing unit 31, according to the control command. For example, when the control command from outside commands the processor 32 to change the zoom magnification, the processor 32 changes the zoom magnification during a capturing operation of the capturing unit 31, according to the control command. For example, when the control command from outside commands the processor to perform a tracking process for a designated subject, the processor 32 tracks the designated subject using the captured video data recorded in the recording unit 33, according to the control command. When various kinds of control commands are acquired by the processor 32, the processor 32 may perform processes corresponding to the respective control commands.

The processor 32 repeatedly transmits the captured video data recorded in the recording unit 33 to the recording server 50 or the cloud server 70 through the wide-area communication unit 34 and the network NW1 (for example, Internet).

The recording unit 33 may include a semiconductor memory embedded in the camera 10 (for example, flash memory) or an external memory medium such as a memory card (for example, SD card), which is not embedded in the camera 10. The recording unit 33 may correlate the captured video data generated by the processor 32 with the identification information on the camera 10 (an example of the camera information) or the date and time information during capturing, and record the resultant data. Furthermore, the recording unit 33 may correlate the captured video data transmitted from the slave cameras (for example, the cameras 11 to 13) with the identification information on the slave cameras (an example of camera information) or the date and time information during capturing, and record the resultant data. The recording unit 33 normally pre-buffers and stores while overwriting data of a video captured for a predetermined time (for example, 30 seconds), and continuously stores data of a video captured for a predetermined time (for example, 30 seconds) before the current time. When the recording unit 33 is configured as a memory card, the recording unit may be freely inserted into and removed from the casing of the camera 10.

The wide-area communication unit 34 is configured using a communication circuit. The wide-area communication unit 34 transmits the captured video data recorded in the recording unit 33 to the recording server 50 or the cloud server 70 through the wired network NW1 such as the Internet, based on an instruction of the processor 32. The wide-area communication unit 34 may receive a control command of the camera, transmitted from the outside (for example, the recording server 50 or the cloud server 70), or transmit status information on the camera to the outside (for example, the recording server 50 or the cloud server 70).

The local communication unit 35 may transmit the control command of the camera, received by the wide-area communication unit 34, to the slave cameras (for example, the cameras 11 to 13) through short range wireless communication, for example, or receive data of captured videos transmitted from the respective slave cameras (for example, the cameras 11 to 13).

The memory 36 is configured using a RAM and ROM, for example, and temporarily stores a program or data required for performing an operation of the camera 10 and information or data generated during the operation of the camera 10. The RAM is a work memory used during an operation of the processor 32, for example. The ROM stores a program and data for controlling the processor 32 in advance. The memory 36 stores identification information for identifying the camera 10 (for example, serial number) and various pieces of setting information.

FIG. 4 is a block diagram illustrating internal configurations of the recording server 50 and the retrieval terminal 90 according to the first embodiment. The recording server 50 and the retrieval terminal 90 may be connected through the Intranet such as a wired LAN provided in the police station, or connected through a local wireless network (for example, wireless LAN).

The recording server 50 includes a communication unit 51, a storage unit 52, a video retrieval unit 53, a video analysis unit 54, a tag assignment unit 55, a pattern extraction unit 56 and a memory 57. The video retrieval unit 53, the video analysis unit 54, the tag assignment unit 55 and the pattern extraction unit 56 are configured as processors such as a CPU, MPU, DSP and FPGA, for example. The pattern extraction unit 56 may not be included in the recording server 50.

The communication unit 51 is configured using a communication circuit. The communication unit 51 communicates with a master camera (for example, the camera 10 or 20) connected through the network NW1 such as the Internet, and receives a captured video transmitted from the master camera (that is, a video showing the situation at the intersection). The communication unit 51 communicates with the retrieval terminal 90 through a network such as the Intranet, provided in the police station, receives a request (instruction) transmitted from the retrieval terminal 90, or transmits a response to the request (instruction). The communication unit 51 transmits a part of the data of the captured video, stored in the storage unit 52, to the cloud server 70.

The storage unit 52 is configured as a hard disk drive (HDD) or solid state driver (SSD). The storage unit 52 correlates data of a captured video, transmitted from the master camera (for example, the camera 10 or 20), with the identification information on the camera having captured the video (an example of camera information) or the date and time information during capturing, and then records the resultant data. The storage unit 52 also records road map information including a plurality of intersections, for example, records updated road map information whenever the road map information is updated by a new construction of road. The storage unit 52 records intersection camera installation data indicating the corresponding relation between one or more cameras installed at each intersection and the intersection. The intersection camera installation data may be correlated with the identification information on the intersection and the identification information on the cameras. In the following descriptions, the same applies. Therefore, the storage unit 52 correlates the captured video data of the cameras with the information on the capturing date and time, the camera information, and the intersection information, and records the resultant data. The road map information may be recorded in a storage unit (not illustrated) similar to the storage unit 72 of the cloud server 70 in the on-premises server described above.

The video retrieval unit 53 retrieves captured video data satisfying a retrieval key (in other words, a retrieval condition for extracting the video of the vehicle image in which the getaway vehicle requested by the retrieval terminal 90 is shown) among the captured video data recorded in the storage unit 52, based on a retrieval request (retrieval instruction) transmitted from the retrieval terminal 90 and containing the retrieval key, and transmits data of the retrieval result through the communication unit 51 such that the data are displayed on the output unit 94 of the retrieval terminal 90.

The video analysis unit 54 analyzes the captured video data recorded in the storage unit 52, and extracts and acquires information on a subject (for example, a person or vehicle) appearing in the captured video. The video analysis unit 54 may acquire information on subjects and a traveling direction (in other words, an escape direction) when the getaway vehicle passes through the intersection, and transmit the acquired information and the captured video data to the tag assignment unit 55 or record the acquired information and the captured video data, which is a video analysis target, in the storage unit 52. The information on subjects may include information on the type, style, color, or number plate of a vehicle (for example, a getaway vehicle having caused an incident), information on a person in the vehicle, or information on the number of people in the vehicle. The video analysis unit 54 can determine the moving direction of the vehicle with respect to the indexing of the traveling direction based on the temporal difference between the frames of the plurality of captured images, for example. The escape direction indicates, for example, that the getaway vehicle has passed through the intersection by any one of straight ahead traveling, left turn traveling, right turn traveling, and rotation traveling.

The tag assignment unit 55 correlates the information on the video analysis result transmitted from the video analysis unit 54 (hereafter, referred to as 'tag information') with the captured video data set to a video analysis target by the video analysis unit 54, and records the resultant data in the storage unit 52. When assigning the tag information to the captured video data, the tag assignment unit 55 also correlates the captured video data with the date and time information on the captured video set to the video analysis target by the video analysis unit 54 and the identification information on the camera having captured the video, and records the resultant data in the storage unit 52. Accordingly, the recording server 50 can clearly determine the location of the intersection where the video was captured, the date and time information on the captured video, and the tag information assigned to the captured video.

The pattern extraction unit 56 determines whether vehicles have the same behavior patterns when routinely passing the intersection, using the tag information and the captured video data which are stored in the storage unit 52. When determining that the behavior patterns are present, the pattern extraction unit 56 records (stores) information on the behavior patterns as pattern information in the storage unit 52. For example, based on a histogram (frequency) of information on the dates and times at which each vehicle has passed the intersection, for the number of the number plate of the vehicle, the pattern extraction unit 56 extracts information on the date and time at which the peak of the histogram was acquired, as the pattern information.

The memory 57 is configured using a RAM and ROM, for example, and temporarily stores a program or data required for performing an operation of the recording server 50 and information or data generated during the operation of the recording server 50. The RAM is a work memory used during an operation of a processor PRC1, for example. The ROM stores a program and data for controlling the processor PRC1 in advance. The memory 57 stores identification information for identifying the recording server 50 (for example, serial number) and various pieces of setting information.

The retrieval terminal 90 includes a manipulation unit 91, a processor 92, a communication unit 93, an output unit 94 and a memory 95. The retrieval terminal 90 is used by an official in the police station, that is, an operator working as a policeman. When a witness to an incident made a call to report the occurrence of the incident, the operator responds to the call with a headset HDS worn on his head. The headset HDS is connected to the retrieval terminal 90, and collects voice generated by the operator or outputs voice of the reporter, transmitted through a telephone (not illustrated) through which the incoming call was made.

The manipulation unit 91 is an UI (User Interface) for detecting an input manipulation of the operator, and may include a mouse or keyboard. The manipulation unit 91 outputs a signal based on the input manipulation of the operator to the processor 92. When the operator wants to check the captured video of the intersection at the date and time that the operator wants to investigate, the manipulation unit 91 receives an input of a retrieval key including the date and time information, the intersection information (for example, the location information on the intersection), and feature information on the getaway vehicle.

The processor 92 is configured using a CPU, MPU, DSP or FPGA, for example, functions as a control unit of the retrieval terminal 90, performs a control process of controlling overall operations of the respective units of the retrieval terminal 90, a data input/output process among the respective units of the retrieval terminal 90, a data calculation process and a data storage process. The processor 92 operates according to a program and data stored in the memory 95. The processor 92 uses the memory 95 during operation, and acquires the current time information or displays retrieval result data for various captured videos on the output unit 94, the retrieval result data being transmitted from the recording server 50 or the cloud server 70. In response to the input of the retrieval key transmitted from the operation unit 91, the processor 92 generates a retrieval request (retrieval instruction) including the retrieval key and transmits the retrieval request (retrieval instruction) to the recording server 50 or the cloud server 70 through the communication unit 93.

The communication unit 93 communicates with the cloud server 70 connected through a network NW3 such as the Internet, and receives various captured videos transmitted from the cloud server 70 (for example, a captured video requested by the retrieval terminal 90). The communication unit 93 communicates with the recording server 50 through a network such as the Intranet, provided in the police state, and transmits a retrieval request (instruction) for various captured videos to the recording server 50), or receives a response to the request (instruction). The various captured videos may include a captured video of a getaway vehicle or intersection which the operator wants to investigate.

The output unit 94 is configured using a display such as an LCD (Liquid Crystal Display) or organic EL (Electroluminescence), for example, and displays various captured video data transmitted from the processor 92. The output unit 94 may also be configured to include not only a display but also a speaker, for example, and output a voice signal sent from the processor 92 (for example, a predetermined warning sound generated when a report call was received from a telephone (not illustrated).

The memory 95 is configured using a RAM and ROM, for example, and temporarily stores a program or data required for performing an operation of the retrieval terminal 90 and information or data generated during the operation of the retrieval terminal 90. The RAM is a work memory used during an operation of the processor 92, for example. The ROM stores a program and data for controlling the processor 92 in advance. The memory 95 stores identification information for identifying the retrieval terminal 90 (for example, serial number) and various pieces of setting information.

Figure 5:
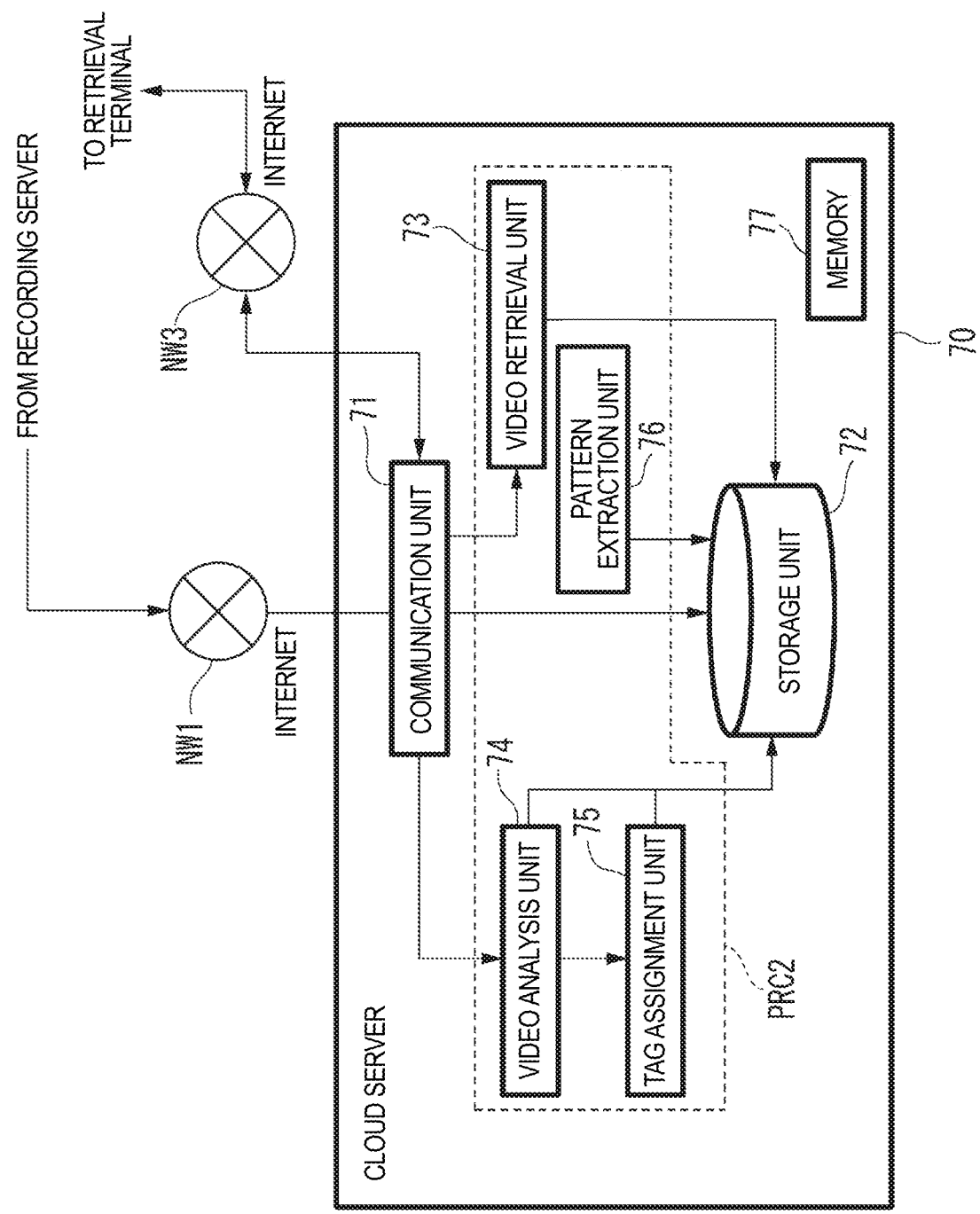
FIG. 5 is a block diagram illustrating an example of an internal configuration of a cloud server according to the first embodiment.

FIG. 5 is a block diagram illustrating an internal configuration of the cloud server 70 according to the first embodiment. The cloud server 70 is connected so as to communicate with the recording server 50 through the network NW1 such as the Internet, and connected so as to communicate with the retrieval terminal 90 through the network NW3 such as the Internet. The networks NW1 and NW3 are preferably different from each other in terms of securing and maintaining security of data or information.

The cloud server 70 includes a communication unit 71, a storage unit 72, a video retrieval unit 73, a video analysis unit 74, a tag assignment unit 75, a pattern extraction unit 76 and a memory 77. The video retrieval unit 73, the video analysis unit 74, the tag assignment unit 75 and the pattern extraction unit 76 are configured as processors PRC2 such as a CPU, MPU, DSP and FPGA, for example. The pattern extraction unit 76 may not be included in the cloud server 70.

The communication unit 71 is configured using a communication circuit. The communication unit 71 performs communication with the recording server 50 connected through the network NW1 such as the Internet, and receives a captured video transmitted from the recording server 50. The captured video may include a captured video designated through an operation of a terminal (not illustrated) used by a manager, for example, a captured video of an important or serious incident. The communication unit 71 performs communication with the retrieval terminal 90 through the network NW3 such as the Internet, and receives a request (instruction) transmitted from the retrieval terminal 90, or transmits a response to the request (instruction).

The storage unit 72 is configured using a HDD or SSD, for example. The storage unit 72 correlates captured video data transmitted from the master camera (for example, the camera 10 or 20) or the recording server 50 with the identification information on the camera having captured the video (an example of camera information) or the date and time information during capturing, and records the resultant data. The storage unit 72 may also record road map information including a plurality of intersections, or record updated road map information whenever the road map information is updated by a new construction or maintenance work of road. The storage unit 72 records intersection camera installation data indicating the corresponding relation between one or more cameras installed at each intersection and the intersection. Therefore, the storage unit 72 correlates the captured video data of the cameras with the information on the capturing date and time, the camera information, and the intersection information, and records the resultant data.

Based on a retrieval request (retrieval instruction) transmitted from the retrieval terminal 90 and containing a retrieval key, the video retrieval unit 73 retrieves captured video data satisfying the retrieval key among the captured video data recorded in the storage unit 72, and transmits data of the retrieval result through the communication unit 51 such that the data are displayed on the output unit 94 of the retrieval terminal 90.

The video analysis unit 74 analyzes the captured video data recorded in the storage unit 72, and extracts and acquires information on a subject (for example, a person or vehicle) appearing in the captured video. The video analysis unit 74 may acquire information on subjects and a traveling direction (in other words, an escape direction) when the getaway vehicle passes through the intersection, and transmit the acquired information and the captured video data to the tag assignment unit 75 or record the acquired information and the captured video data, which is a video analysis target, in the storage unit 72. The information on subjects may include information on the type, style, color, or number plate of a vehicle (for example, a getaway vehicle having caused an incident), information on a person in the vehicle, or information on the number of people in the vehicle. The video analysis unit 54 can determine the moving direction of the vehicle with respect to the indexing of the traveling direction based on the temporal difference between the frames of the plurality of captured images, for example The tag assignment unit 75 correlates the information on the video analysis result transmitted from the video analysis unit 74 (hereafter, referred to as 'tag information') with the captured video data set to a video analysis target by the video analysis unit 74, and records the resultant data in the storage unit 72. When assigning the tag information to the captured video data, the tag assignment unit 75 also correlates the captured video data with the date and time information on the captured video set to the video analysis target by the video analysis unit 74 and the identification information on the camera having captured the video, and records the resultant data in the storage unit 72. Accordingly, the recording server 70 can clearly determine the location of the intersection where the video was captured, the date and time information on the captured video, and the tag information assigned to the captured video.

The pattern extraction unit 76 determines whether vehicles have the same behavior patterns when routinely passing an intersection, using the tag information and the captured video data which are recorded in the storage unit 72. When determining that the behavior patterns are present, the pattern extraction unit 76 records (stores) information on the behavior patterns as pattern information in the storage unit 72. For example, based on a histogram (frequency) of information on the dates and times at which each vehicle has passed the intersection, for the number of the number plate of the vehicle, the pattern extraction unit 76 extracts information on the date and time at which the peak of the histogram was acquired, as the pattern information.

The memory 77 is configured using a RAM and ROM, for example, and temporarily stores a program or data required for performing an operation of the cloud server 70 and information or data generated during the operation of the cloud server 70. The RAM is a work memory used during an operation of a processor PRC2, for example. The ROM stores a program and data for controlling the processor PRC2 in advance. The memory 77 stores identification information for identifying the cloud server 70 (for example, serial number) and various pieces of setting information.

Various screens displayed on the output unit 94 of the retrieval terminal 90 in the police station will be described below with reference to FIGS. 6 to 11, for example.

Figure 6:
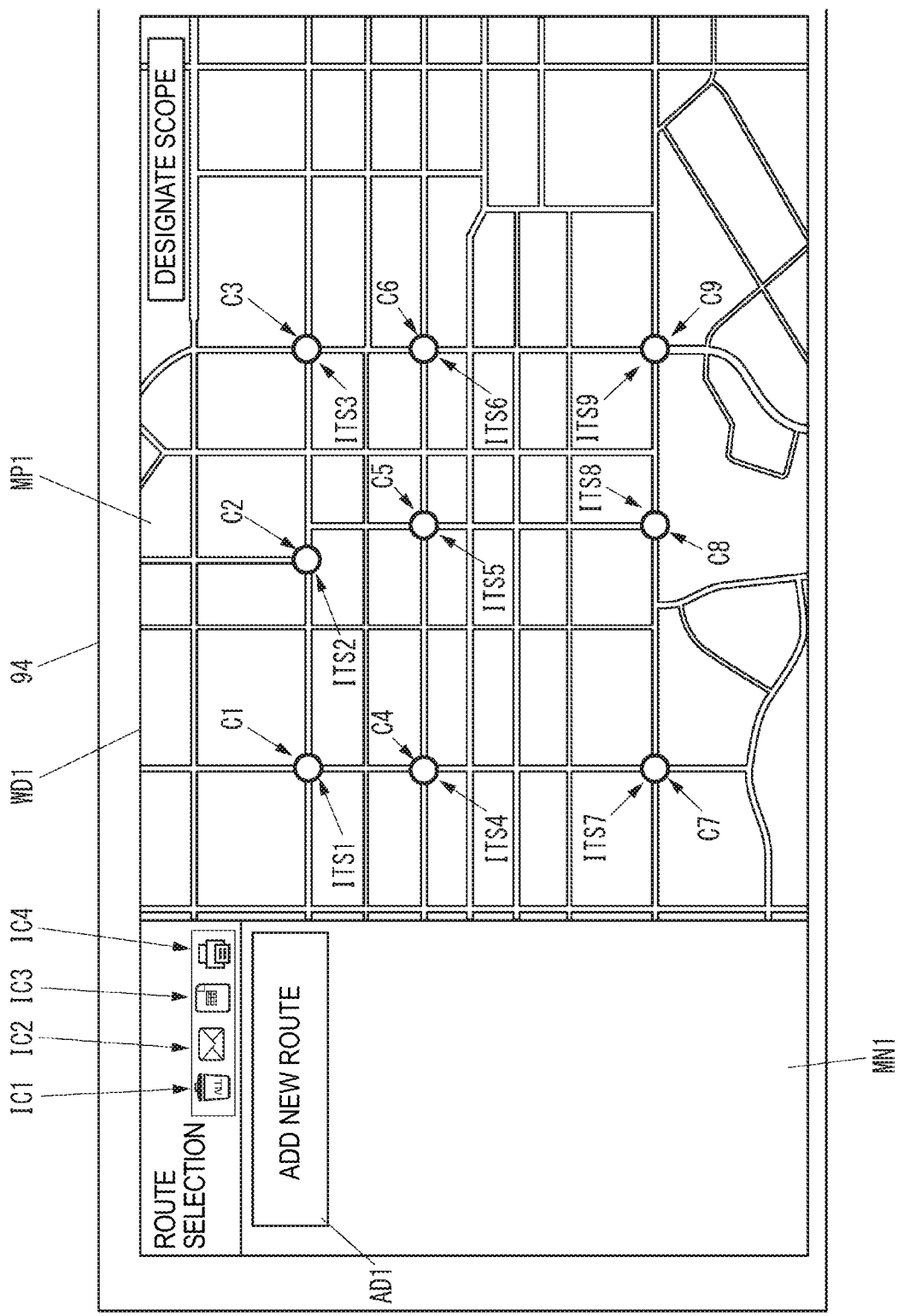
FIG. 6 is a view illustrating an example of a route selection screen.

FIG. 6 is a view illustrating an example of a route selection screen WD1. The route selection screen WD1 is displayed on the output unit 94 of the retrieval terminal 90, for example, based on the operation of an operator (that is, a policeman) using the retrieval terminal 90 in the police station. The route selection screen WD1 is, for example, an example of a display screen of a dedicated application for getaway vehicle search which is previously installed in the retrieval terminal 90, and is configured in which a route selection menu MN1 is superimposed and displayed on a road map MP1 corresponding to road map information (that is, specified by the road map information). The dedicated application for getaway vehicle search is executed by the processor 92, and the same applies to the following description.

Figure 7:
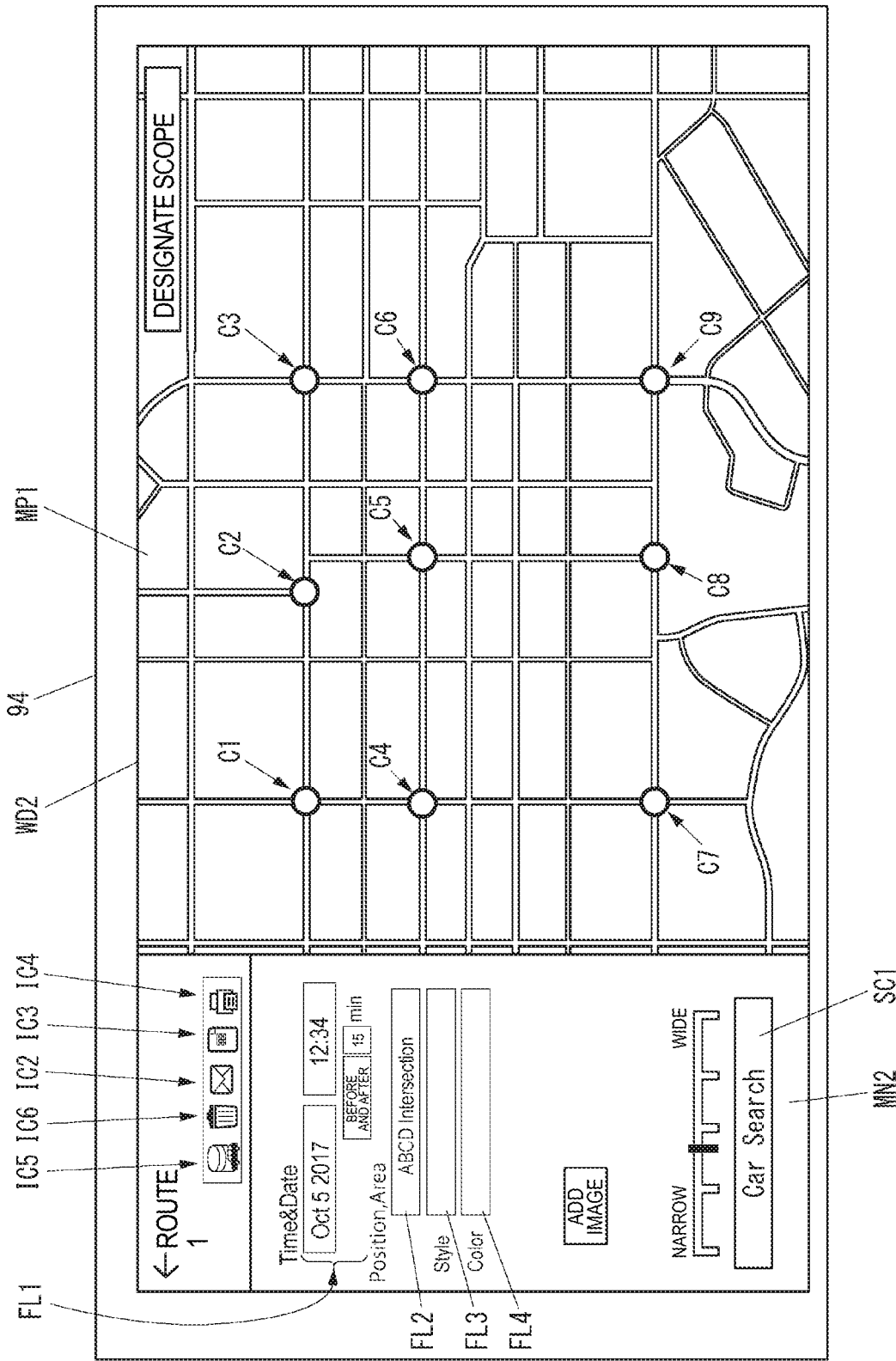
FIG. 7 is a view illustrating an example of a retrieval condition input screen for retrieving a candidate vehicle.
Figure 11:
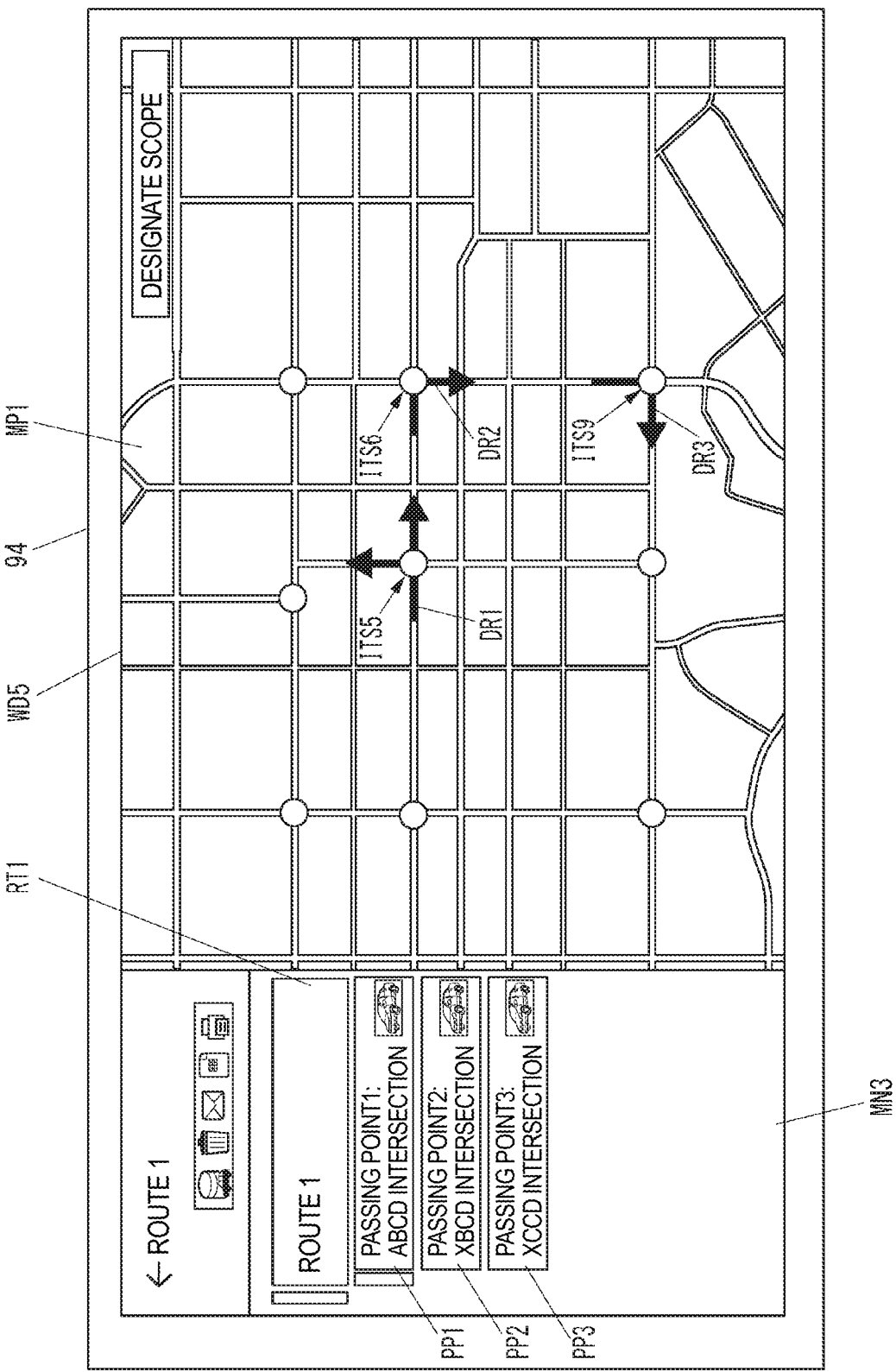
FIG. 11 is a view illustrating an example of a route output screen for presenting the escape route of the candidate vehicle.

On the road map MP1 of the route selection screen WD1, installation locations of cameras C1, C2, C3, C4, C5, C6, C7, C8, and C9 installed corresponding to respective intersections ITS1, ITS2, ITS3, ITS4, ITS5, ITS6, ITS7, ITS8, and ITS9 are visually shown so as to be distinguishable, and the same applies to the following description. The cameras C1 to C9 have the same configuration as the master camera (specifically, the camera 10 or 20) illustrated in FIG. 1, and the same applies to the following description. In FIGS. 6, 7, and 11, the cameras C1 to C9 are arranged in consideration of the congestion situation, for example, the number of persons or vehicles on the road including the intersections, and the arrangement thereof is merely an example. Therefore, for example, cameras having a similar configuration may be arranged at all intersections on the road map MP1.

The route selection menu MN1 includes, for example, four kinds of icons IC1, IC2, IC3, and IC4 and a route addition button AD1.

The icon IC1 is an entire selection route delete icon for deleting all route information displayed on the route selection menu MN1.

The icon IC2 is a transmission-mail transmission icon for instructing activation of a mailer (not illustrated) capable of creating a mail for transmitting the created route information (for example, see step ST6 illustrated in FIG. 12 to be described below) to another device (not illustrated).

The icon IC3 is a file output icon for instructing a process of storing the created route information (for example, see step ST6 illustrated in FIG. 12 to be described below) in the memory 95 as a data file.

The icon IC4 is a file print icon for instructing a process of outputting and printing the created route information (for example, see step ST6 illustrated in FIG. 12 to be described below) to a printer (not illustrated) connected to the retrieval terminal 90, as an escape route report.

The route addition button AD1 is a button that is selected (for example, pressed) by the operation of an operator who creating information on the escape route (the above-described route information) of a vehicle (that is, a getaway vehicle) causing the occurrence of the incident when the incident occurs. When the route addition button AD1 is selected (for example, pressed) by the operation of the operator, the processor 92 (for example, the dedicated application for getaway vehicle search described above) of the retrieval terminal 90 detects the selection, and outputs (displays) a retrieval condition input screen WD2 illustrated in FIG. 7 to the output unit 94. The processor 92 (for example, the dedicated application for getaway vehicle search described above) of the retrieval terminal 90 may output (display) the retrieval condition input screen WD2 illustrated in FIG. 7 to the output unit 94 when detecting that one of the cameras C1 to C9 displayed on the road map MP1 is selected (for example, pressed).

FIG. 7 is a view illustrating an example of the retrieval condition input screen WD2 for retrieving a candidate vehicle. The retrieval condition input screen WD2 is displayed on the output unit 94 of the retrieval terminal 90, for example, based on the operation of an operator (that is, a policeman) using the retrieval terminal 90 in the police station. The retrieval condition input screen WD2 is an example of a display screen of the dedicated application for getaway vehicle search which is previously installed in the retrieval terminal 90, for example, and has a configuration in which a retrieval condition input menu MN2 is superimposed and displayed on the road map MP1.

The retrieval condition input menu MN2 includes, for example, five kinds of icons IC5, IC6, IC2, IC3, and IC4, a capturing time input field FL1, a position area input field FL2, a style input field FL3, a vehicle-color input field FL4, and a retrieval button SC1. Since the icons IC2 to IC4 are the same as those described with reference to FIG. 6, the description is not presented herein.

The icon IC5 is a vehicle selection and edit icon for instructing a display of a screen (not illustrated) for editing information on a vehicle set as a getaway vehicle candidate (hereinafter, referred to as a "candidate vehicle") causing the occurrence of the incident.

The icon IC6 is a route cancellation icon for deleting data (that is, route information) of an escape route once created or an escape route which is being created.

The capturing time input field FL1 is used to input an occurrence date and time of an incident heard by the operator from a reporter so as to request the recording server 50 to retrieve an image of the getaway vehicle causing the occurrence of the incident from the retrieval terminal 90. In the capturing time input field FL1 in FIG. 7, a retrieval target period is input, for example, 15 minutes before and after 12:34 on Oct. 5, 2017. The processor 92 (for example, the dedicated application for getaway vehicle search described above) of the retrieval terminal 90 generates a retrieval key including the input occurrence date and time as a capturing date and time. For the occurrence date and time, for example, a date may be selected from a calendar (not illustrated) and a time may be selected from a drop down list (not illustrated) or may be directly input. In addition, the occurrence date and time of the incident may be designated as a certain period from what time till what time.

The position area input field FL2 is used to input an occurrence point of an incident heard through a telephone by the operator from a reporter so as to request the recording server 50 to retrieve an image of the getaway vehicle causing the occurrence of the incident from the retrieval terminal 90. In the position area input field FL2 in FIG. 7, for example, an ABCD intersection corresponding to the intersection ITS5 (see FIG. 6) is input as an occurrence point of the retrieval target. The processor 92 (for example, the dedicated application for getaway vehicle search described above) of the retrieval terminal 90 generates a retrieval key including the input occurrence point.

The style input field FL3 is used to input a getaway vehicle style (for example, a type or style of a vehicle), which is heard through a telephone by the operator from a reporter, so as to request the recording server 50 to retrieve an image of the getaway vehicle causing the occurrence of the incident from the retrieval terminal 90. The style may be directly input by the operation of the operator, or may be input by selection from a retrieval condition detail input menu AS1 illustrated in FIG. 8. The processor 92 (for example, the dedicated application for getaway vehicle search described above) of the retrieval terminal 90 generates a retrieval key including the input style (for example, a type or style of the vehicle). In the following description, the type of the vehicle indicates a concrete type of the getaway vehicle, and the style of the vehicle indicates a style of the getaway vehicle (for example, sedan, truck, or wagon) and a type of door (for example, two doors, three doors, or four doors).

The vehicle-color input field FL4 is used to input a color of a getaway vehicle, which is heard through a telephone by the operator from a reporter, so as to request the recording server 50 to retrieve an image of the getaway vehicle causing the occurrence of the incident from the retrieval terminal 90. The color of the vehicle may be directly input by the operation of the operator, or may be input by selection from the retrieval condition detail input menu AS1 illustrated in FIG. 8. The processor 92 (for example, the dedicated application for getaway vehicle search described above) of the retrieval terminal 90 generates a retrieval key including the input vehicle-color.

Figure 8:
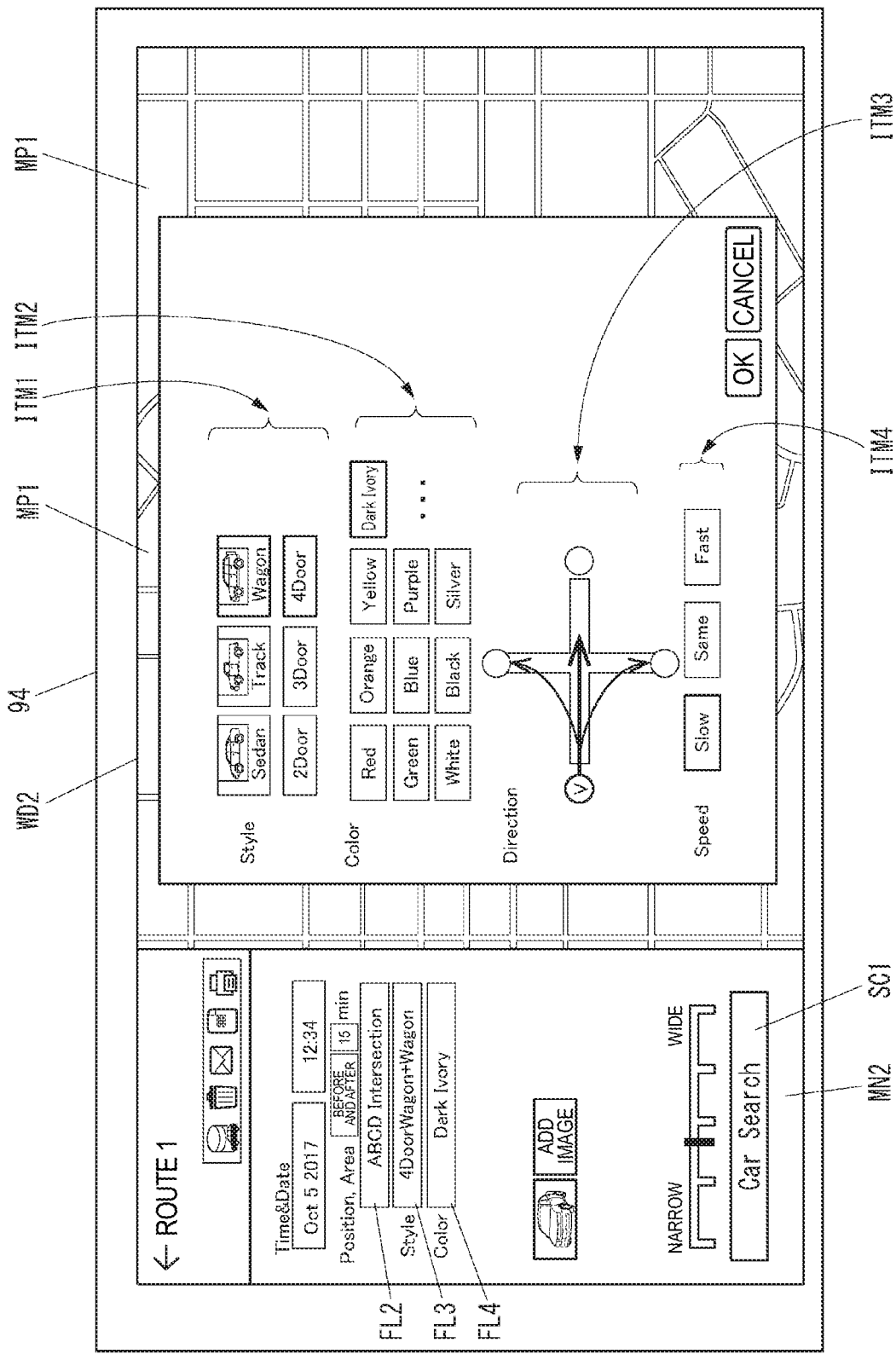
FIG. 8 is a view illustrating an example of a retrieval condition detail input menu for inputting detailed retrieval conditions of the candidate vehicle.

When a predetermined input field (for example, the style input field FL3 or the vehicle-color input field FL4) is selected (pressed), the processor 92 (for example, the dedicated application for getaway vehicle search described above) of the retrieval terminal 90 may detect the selection, and may cause the retrieval condition detail input menu AS1 illustrated in FIG. 8 to be superimposed and displayed on the road map MP1.

The retrieval button SC1 is a button for instructing a process of requesting the retrieval key generated by the processor 92 (for example, the dedicated application for getaway vehicle search described above) from the retrieval terminal 90 to the recording server 50 or the cloud server 70. When the retrieval button SC1 is selected (for example, pressed) by the operation of the operator, the processor 92 (for example, the dedicated application for getaway vehicle search described above) of the retrieval terminal 90 detects the selection, and generates a retrieval key including the occurrence date and time input to the capturing time input field FL1, the occurrence point input to the position area input field FL2, the style (for example, the type and style of the vehicle) input to the style input field FL3, and the color of the vehicle input to the vehicle-color input field FL4. The processor 92 (for example, the dedicated application for getaway vehicle search described above) of the retrieval terminal 90 transmits the generated retrieval key to the recording server 50 or the cloud server 70 via the communication unit 93 and requests to retrieve the image of the getaway vehicle. The recording server 50 or the cloud server 70 refers to the storage unit 52 or the storage unit 72 based on the retrieval key transmitted from the retrieval terminal 90 and retrieves the captured image or the captured video on which a candidate vehicle of a getaway vehicle satisfying the retrieval condition defined by the retrieval key is projected.

FIG. 8 is a view illustrating an example of the retrieval condition detail input menu AS1 used to input detailed retrieval conditions of the candidate vehicle. Similarly to the retrieval condition input screen WD2 illustrated in FIG. 7, the retrieval condition detail input menu AS1 is displayed on the output unit 94 of the retrieval terminal 90 based on the operation of the operator (that is, the policeman) using the retrieval terminal 90 in the police station, for example. The retrieval condition detail input menu AS1 is an example of a display screen of the dedicated application for getaway vehicle search which is previously installed in the retrieval terminal 90, for example, and is superimposed and displayed on the road map MP1 of the retrieval condition input screen WD2.

The retrieval condition detail input menu AS1 includes a detailed selection item ITM1 of style, a detailed selection item ITM2 of vehicle color, a detailed selection item ITM3 of traveling direction, and a detailed selection item ITM4 of vehicle speed.

The detailed selection item ITM1 includes options such as "sedan", "truck", and "wagon" and options such as "two doors", "three doors", and "four doors", as types of getaway vehicles. In the example of the detailed selection item ITM1 in FIG. 8, the "wagon" and the "four doors" are highlighted compared with other options, and the "wagon" and the "four doors" are respectively selected by the operation of the operator. A plurality of types may be selected from the options of "sedan", "truck", and "wagon", and similarly a plurality of types may be selected from the options of "two doors", "three doors" and "four doors".

The detailed selection item ITM2 includes options, for example, "red", "orange", "yellow", "dark ivory", "green", "blue", "purple", "white", "black", and "gray", as the colors of the getaway vehicle. In the example of the detailed selection item ITM2 in FIG. 8, the "dark ivory" is highlighted compared with other options, and the "dark ivory" is selected by the operation of the operator. A plurality of colors may be selected from the options of the "red", "orange", "yellow", "dark ivory", "green", "blue", "purple", "white", "black", and "gray".

The detailed selection item ITM3 designates a traveling direction (in other words, an escape direction) as a retrieval condition (retrieval key) with the operation of the operator when the getaway vehicle passes through the intersection. Specifically, the detailed selection item ITM3 includes an intersection and four radio buttons which are regarded as interposing the intersection. When one of the four radio buttons is selected by the operation of the operator, the processor 92 (for example, the dedicated application for getaway vehicle search described above) of the retrieval terminal 90 selects a direction from the selected radio button as a start point to a secondly selected radio button of the remaining three radio buttons, as an escape direction. In the example of the detailed selection item ITM3 in FIG. 8, the "straight direction at the intersection from the west side to the east side" is highlighted compared with the other direction (that is, "the left-turn direction from the west side to the north side" or "the right-turn direction from the west side to the south side"), and the "straight direction from the west side to the east side" is selected as an escape direction of the getaway vehicle by the operation of the operator.

The detailed selection item ITM4 includes options of "Slow", "Same", "Fast" as a getaway speed (so-called vehicle speed) when the getaway vehicle passes through the intersection. The "Slow" indicates that the vehicle speed is relatively slower than an average vehicle speed of the intersection through which the getaway vehicle passes, for example. The "Same" indicates, for example, that the vehicle speed is substantially the same as the average vehicle speed of the intersection through which the getaway vehicle passes. The "Fast" indicates, for example, that the vehicle speed is relatively faster than the average vehicle speed of the intersection through which the getaway vehicle passes. In the example of the detailed selection item ITM4 FIG. 8, the "Slow" is highlighted compared with other options (that is, the options off the "Same" and the "Fast"), and the "Slow" is selected, as a getaway speed of the getaway vehicle passing through the intersection, by the operation of the operator.

When an OK button is selected (for example, pressed) after various options for the detailed selection items ITM1 to ITM4 are selected, the processor 92 (for example, the dedicated application for getaway vehicle search described above) of the retrieval terminal 90 can set "4-door wagon or wagon", for example, in the style input field FL3 of the retrieval condition input menu MN2, taking the detailed retrieval condition using the retrieval condition detail input menu AS1 into consideration, can further set the "dark ivory", for example, in the vehicle-color input field FL4 of the retrieval condition input menu MN2.

When an "image addition" button in the retrieval condition input menu MN2 is selected (pressed) by the operation of the operator, the processor 92 (for example, the dedicated application for getaway vehicle search described above) of the retrieval terminal 90 can display a selection dialog (not illustrated) of the image data file of the vehicle recorded in the memory 95 of the retrieval terminal 90, so that the operator can select the image data file of the vehicle. When the image data file is selected, the processor 92 (for example, the dedicated application for getaway vehicle search described above) of the retrieval terminal 90 may display the icon of the vehicle of the selected image data file on the retrieval condition input menu MN2, analyze feature information on the vehicle using the image data of the image data file, and reflect the analysis result in the style input field FL3 or the vehicle-color input field FL4 for addition. In addition, when the icon of the vehicle displayed on the retrieval condition input menu MN2 is subjected to a mouseover by the operation of the operator, the processor 92 (for example, the dedicated application for getaway vehicle search described above) of the retrieval terminal 90 detects the mouseover, and displays a button capable of deleting the icon of the vehicle. When the button is selected (for example, pressed), the processor 92 (for example, the dedicated application for getaway vehicle search described above) of the retrieval terminal 90 may delete the analysis result of the deleted vehicle from the style input field FL3 or the vehicle-color input field FL4.

Figure 9:
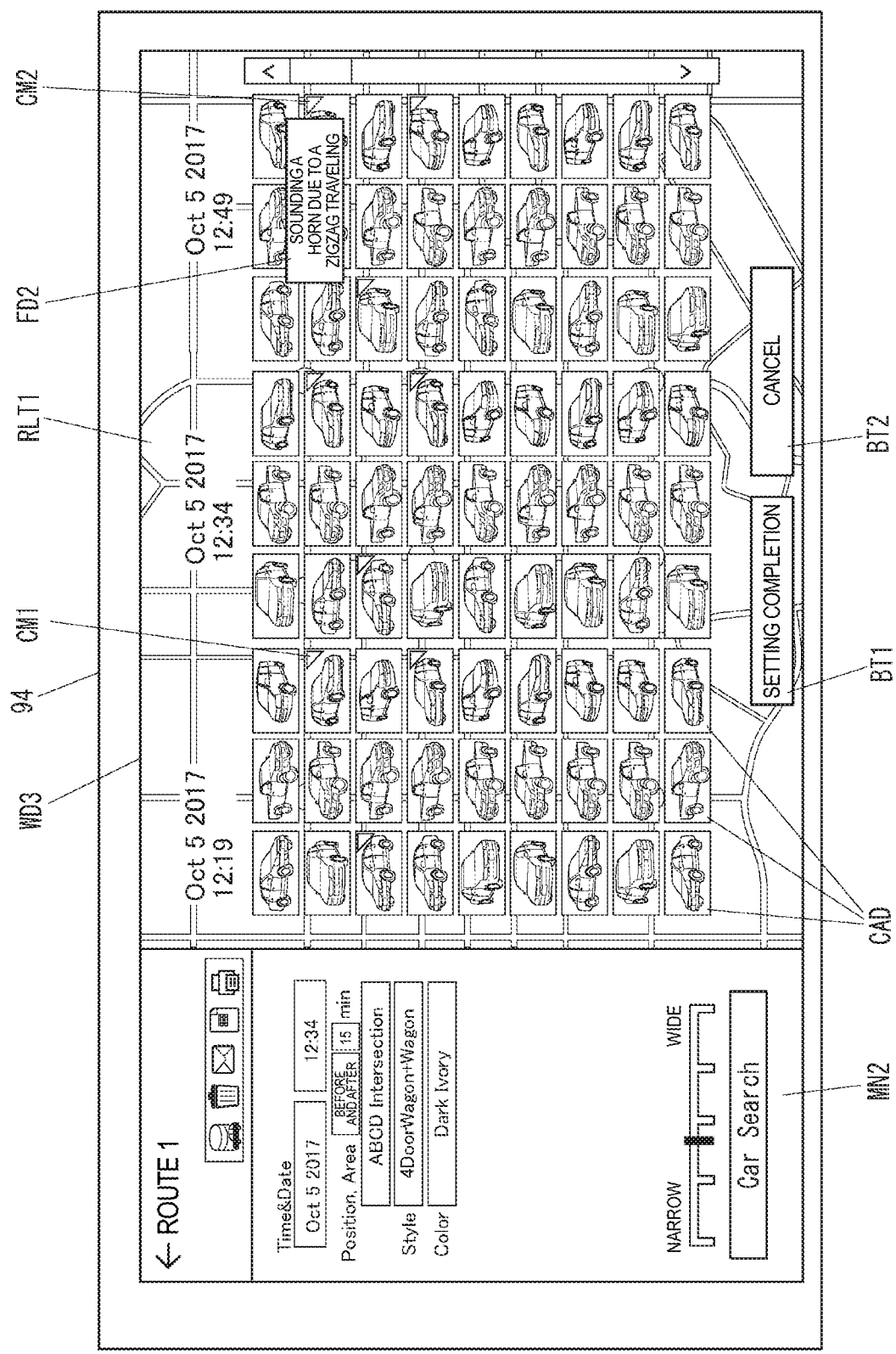
FIG. 9 is a view illustrating an example of a retrieval result display screen of the candidate vehicle.

FIG. 9 is a view illustrating an example of a retrieval result display screen WD3 of the candidate vehicle. The retrieval result display screen WD3 is displayed on the output unit 94 of the retrieval terminal 90, based on the operation of an operator (that is, a policemen) using the retrieval terminal 90 in the police station, for example. The retrieval result display screen WD3 is an example of a display screen of the dedicated application for getaway vehicle search which is previously installed in the retrieval terminal 90, and is configured in which a retrieval condition input menu MN2 and a screen RLT1 including a list of the retrieval result of the candidate vehicle are superimposed and displayed on the road map MP1. Since the content of the retrieval condition input menu MN2 is the same as the retrieval condition input menu MN2 in FIG. 8, the description thereof will not be presented herein.

The screen RLT1 including the list of the retrieval result of the candidate vehicle includes a list of the retrieval result of the candidate vehicle that is a candidate of the getaway vehicle retrieved by the recording server 50 or the cloud server 70 based on the selection (for example, pressing) of the retrieval button SC1. Specifically, as the candidate vehicle satisfying various retrieval conditions input to the retrieval condition input menu MN2, the list includes a list of at least one candidate vehicle CAD in a capturing date and time (for example, 12:34 on Oct. 5, 2017) of the capturing time input field FL1 and capturing dates and times (for example, 12:19 and 12:49 on Oct. 5, 2017) before and after 15 minutes from the capturing date and time. The operator directly browses the screen RLT1 including the list of the retrieval result of the candidate vehicle by visual observation, narrows down the appropriate vehicles as the candidate vehicles of the getaway vehicles by replying on the information or the like heard on the phone from the reporter, and performs a selection operation. Thus, when the incident occurs, the operator can precisely narrow down the candidate vehicle of the getaway vehicle that caused the occurrence of the incident, and can quickly grasp the escape route of the getaway vehicle created by the retrieval terminal 90.

The processor 92 (for example, the dedicated application for getaway vehicle search described above) of the retrieval terminal 90 is an example of feature information on the candidate vehicle, and can store the comment input by the operation of the operator in the memory 95 in correlation with the candidate vehicle. In this case, the processor 92 (for example, the dedicated application for getaway vehicle search described above) of the retrieval terminal 90 can display a marker CM1 indicating the storage of the comment in correlation with the icon of the corresponding candidate vehicle CAD. For example, the processor 92 (for example, the dedicated application for getaway vehicle search described above) of the retrieval terminal 90 stores a comment FD2 indicating "sounding a horn because of a zigzag traveling" in the memory 95 in correlation with the corresponding candidate vehicle. The processor 92 (for example, the dedicated application for getaway vehicle search described above) of the retrieval terminal 90 displays a marker CM2 indicating that the comment FD2 is stored, in the icon of the candidate vehicle CAD.

When the number of candidate vehicles to be extracted is too large to be displayed within the screen RLT1 including the list of the retrieval results of the candidate vehicles, the processor 92 (for example, the dedicated application for getaway vehicle search described above) of the retrieval terminal 90 can display a list of all the candidate vehicles in the list by the scroll operation of the operator.

In addition, when a setting completion button BT1 is selected (for example, pressed) by the operation of the operator in a state the icon of the candidate vehicle CAD is temporarily selected (for example, pressed) by the operator, the processor 92 (for example, the dedicated application for getaway vehicle search described above) of the retrieval terminal 90 detects the selection, and sets (registers) the traveling direction (in other words, the escape direction) when the selected candidate vehicle CAD passes through the intersection (that is, the intersection input to the position area input field FL2) in correlation with information on the candidate vehicle CAD, thereby storing the traveling direction in the memory 95. Therefore, the processor 92 (for example, the dedicated application for getaway vehicle search described above) of the retrieval terminal 90 sets a traveling direction (in other words, an escape direction) when passing through at least two different passing points (in other words, intersections) with respect to the icon of the same candidate vehicle in the memory 95 to create route information when the candidate vehicle travels through these passing points as an escape route.

On the other hand, when a cancel button BT2 is selected (for example, pressed) by the operation of the operator in a state where the icon of the candidate vehicle CAD is temporarily selected (for example, pressed) by the operator, the processor 92 (for example, the dedicated application for getaway vehicle search described above) of the retrieval terminal 90 detects the selection, and cancels (that is, releases) of the temporary selection state of the icon of the candidate vehicle CAD which is temporarily selected once.

Figure 10:
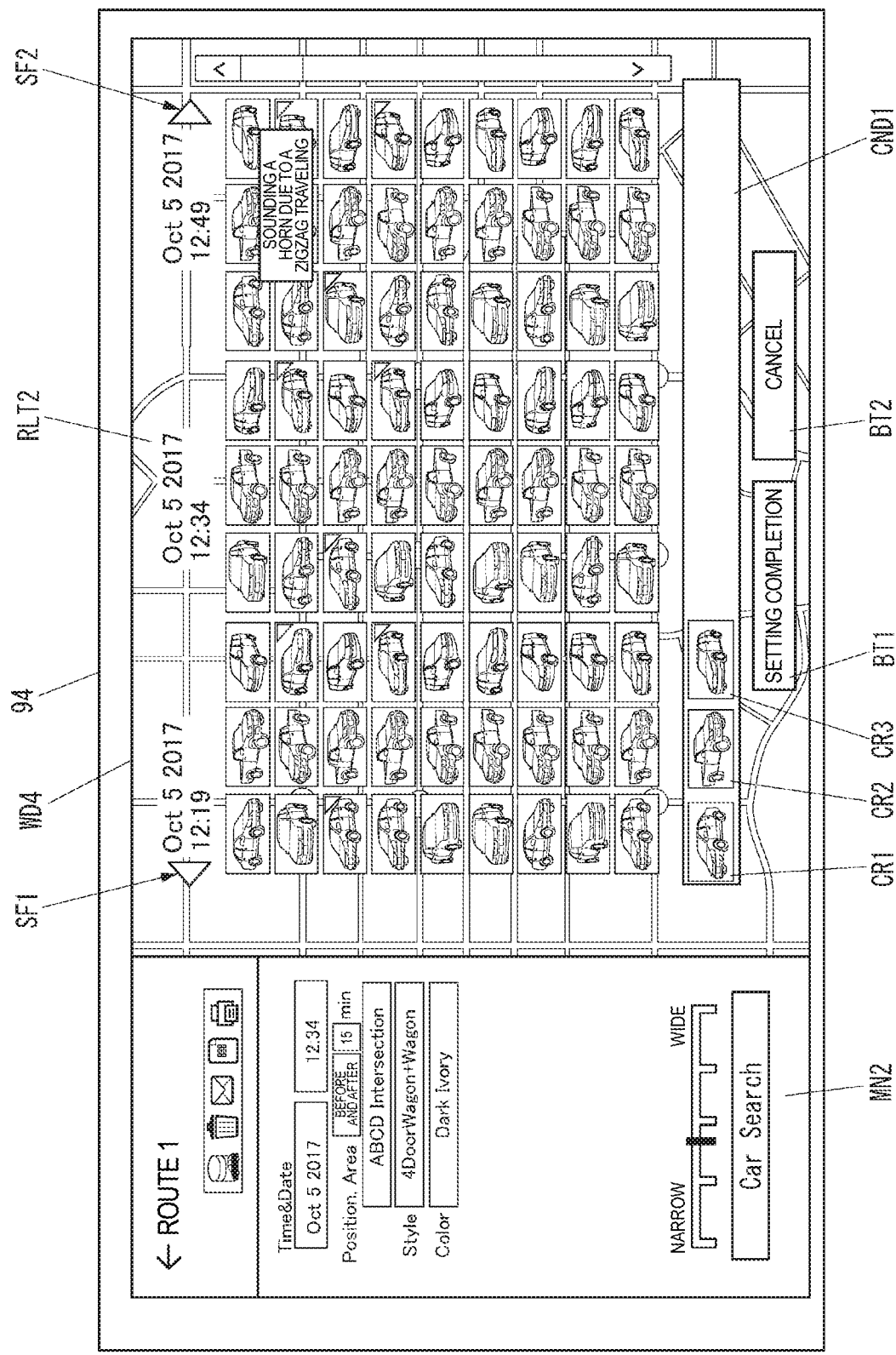
FIG. 10 is a view illustrating an example of a candidate vehicle setting screen for registering an escape route of the candidate vehicle.

FIG. 10 is a view illustrating an example of a candidate vehicle setting screen WD4 for registering the escape route of the candidate vehicle. The candidate vehicle setting screen WD4 is displayed when a predetermined operation is performed by the operator while the retrieval result display screen WD3 is displayed on the output unit 94. The candidate vehicle setting screen WD4 is displayed on the output unit 94 of the retrieval terminal 90 based on the operation of the operator (that is, the policeman) using the retrieval terminal 90 in the police station, for example. The candidate vehicle setting screen WD4 is an example of a display screen of the dedicated application for getaway vehicle search which is previously installed in the retrieval terminal 90, for example, and is configured in which a retrieval condition input menu MN2 and a screen RLT2 including a list of the retrieval result of the candidate vehicle are superimposed and displayed on the road map MP1. Since the content of the retrieval condition input menu MN2 is the same as the retrieval condition input menu MN2 in FIG. 8, the description thereof will not be presented herein.

The screen RLT2 including the list of the retrieval result of the candidate vehicle includes a list of retrieval results of the candidate vehicle similar to the screen RLT1 including the list of the retrieval result of the candidate vehicle and a candidate vehicle selection box CND1. Since the list of the retrieval result of the candidate vehicle in the screen RLT2 including the list of the retrieval result of the candidate vehicle is the same as in FIG. 9, the description thereof will not be presented herein. The candidate vehicle selection CND1 displays icon (for example, icons CR1, CR2, and CR33 of three candidate vehicles) of at least one candidate vehicle that has been temporarily selected by the operation of the operator.

A front shift button SF1 is an icon for instructing the recording server 50 or the cloud server 70 to retrieve the image for a certain period of time (for example, a time which is half the time of "15 minutes" input to the capturing time input field FL1) back to the time faster than a starting point (that is, 15 minutes before 12:34 on Oct. 5, 2017) of the period including the capturing date and time input to the capturing time input field FL1. When the front shift button SF1 is selected (for example, pressed) once, the processor 92 (for example, the dedicated application for getaway vehicle search described above) of the retrieval terminal 90 generates a retrieval key for instructing the recording server 50 or the cloud server 70 to retrieve the image again for a certain period of time (for example, a time which is half the time of "15 minutes" input to the capturing time input field FL1) back to the time faster than a starting point (that is, 15 minutes before 12:34 on Oct. 5, 2017) of the period including the capturing date and time input to the capturing time input field FL1.

A rear shift button SF2 is an icon for instructing the recording server 50 or the cloud server 70 to retrieve the image for a certain period of time (for example, a time which is half the time of "15 minutes" input to the capturing time input field FL1) proceeding to the time later than a starting point (that is, 15 minutes after 12:34 on Oct. 5, 2017) of the period including the capturing date and time input to the capturing time input field FL1. When the rear shift button SF2 is selected (for example, pressed) once, the processor 92 (for example, the dedicated application for getaway vehicle search described above) of the retrieval terminal 90 generates a retrieval key for instructing the recording server 50 or the cloud server 70 to retrieve the image again for a certain period of time (for example, a time which is half the time of "15 minutes" input to the capturing time input field FL1) back to the time faster than a starting point (that is, 15 minutes before 12:34 on Oct. 5, 2017) of the period including the capturing date and time input to the capturing time input field FL1.

Further, for example, when the icons of three candidate vehicles CAD are temporarily selected (for example, pressed) by the operator, the processor 92 (for example, the dedicated application for getaway vehicle search described above) of the retrieval terminal 90 displays the icons CR1 to CR3 on the candidate vehicle selection box CND1 by the operation of the operator. When the setting completion button BT1 is selected (for example, pressed) by the operation of the operator in a state where the temporarily selected icons CR1 to CR3 of the three candidate vehicles CAD are displayed on the candidate vehicle selection box CND1, the processor 92 (for example, the dedicated application for getaway vehicle search described above) of the retrieval terminal 90 detects the selection, and sets (registers) the traveling direction (in other words, the escape direction) when the selected candidate vehicle CAD passes through the intersection (that is, the intersection input to the position area input field FL2) in correlation with information on the candidate vehicles CAD corresponding to the respective icons CR1 to CR3, thereby storing the traveling direction in the memory 95. Therefore, the processor 92 (for example, the dedicated application for getaway vehicle search described above) of the retrieval terminal 90 sets a traveling direction (in other words, an escape direction) when passing through at least two different passing points (in other words, intersections) with respect to the icon of the same candidate vehicle in the memory 95 to create route information when the candidate vehicle travels through these passing points as an escape route.

On the other hand, when the cancel button BT2 is selected (for example, pressed) by the operation of the operator in a state where the temporarily selected icons CR1 to CR3 of the three candidate vehicles CAD are displayed on the candidate vehicle selection box CND1, the processor 92 (for example, the dedicated application for getaway vehicle search described above) of the retrieval terminal 90 detects the selection, and cancels (that is, releases) of the temporary state of the icons CR1 to CR3 of the candidate vehicles CAD which are temporarily selected once.

FIG. 11 is a view illustrating one example of a route output screen WD5 for showing the escape route of the candidate vehicle. The route output screen WD5 is displayed in the output unit 94 of the retrieval terminal 90 on the basis of the operation of the operator (that is, the policeman) which uses the retrieval terminal 90 in the police station, for example. The route output screen WD5 is one example of the display screen of the dedicated application for getaway vehicle search installed in advance in the retrieval terminal 90, for example, and has a configuration in which a route detailed menu MN3 is displayed to be superimposed on the road map MP1.

Similarly to the road map MP1 of the route selection screen WD1 of FIG. 6, on the road map MP1 of the route output screen WD5, the installation locations of the cameras C1, C2, C3, C4, C5, C6, C7, C8, and C9 installed corresponding to the respective intersection ITS1, ITS2, ITS3, ITS4, ITS5, ITS6, ITS7, ITS8, and ITS9 are visually shown so as to be distinguishable.

Arrows DR1, DR2, and DR3 which indicate the traveling direction (in other words, the escape direction) at the time of passing three passing points configuring a route 1 corresponding to an icon RT1 displayed in the route detailed menu MN3 are respectively shown on the road map MP1 of the route output screen WD5. Specifically, the three passing points are the intersection ITS5 (first passing point) which is an ABCD intersection, the intersection ITS6 (second passing point) which is an XBCD intersection, and the intersection ITS9 (third passing point) which is an ACCD intersection. Therefore, the operator can recognize intuitively and visually that the getaway vehicle passes straight through the intersection ITS5 which is the ABCD intersection, passes the intersection ITS6 which is the XBCD intersection by a left turn, and passes the intersection ITS9 which is the ACCD intersection by a left turn.

When the icon RT1 of the route detailed menu MN3 is selected (for example, pushed down) by the operation of the operator, the processor 92 (for example, the above-described dedicated application for getaway vehicle search) of the retrieval terminal 90 detects the selection to develop and display respective icons PP1, PP2, and PP3 of the first to third passing points configuring the route 1 corresponding to the icon RT1.

For example, when the icon RT1 is double-clicked by the operation of the operator, the processor 92 (for example, the above-described dedicated application for getaway vehicle search) of the retrieval terminal 90 may time-serially blink-displays the traveling direction (in other words, the escape direction) at the time when the candidate vehicle passes the intersections of the first to third passing points, for example, so as to urge the operator to recognize in an easily understandable manner.

Similarly, when the icon PP1 is double-clicked by the operation of the operator, the processor 92 (for example, the above-described dedicated application for getaway vehicle search) of the retrieval terminal 90 may blink-display the traveling direction (in other words, the escape direction) at the time when the candidate vehicle passes the first passing point (that is, the intersection ITS5 which is the ABCD intersection), for example, so as to urge the operator to recognize in an easily understandable manner.

Similarly, when the icon PP2 is double-clicked by the operation of the operator, the processor 92 (for example, the above-described dedicated application for getaway vehicle search) of the retrieval terminal 90 may blink-display the traveling direction (in other words, the escape direction) at the time when the candidate vehicle passes the second passing point (that is, the intersection ITS6 which is the XBCD intersection), for example, so as to urge the operator to recognize in an easily understandable manner.

Similarly, when the icon PP3 is double-clicked by the operation of the operator, the processor 92 (for example, the above-described dedicated application for getaway vehicle search) of the retrieval terminal 90 may blink-display the traveling direction (in other words, the escape direction) at the time when the candidate vehicle passes the third passing point (that is, the intersection ITS9 which is the ACCD intersection), for example, so as to urge the operator to recognize in an easily understandable manner.

Next, a motion examples of a process in which the recording server 50 and the retrieval terminal 90 according to the first embodiment create the route information on the escape route of the getaway vehicle and displays the route information on the output unit 94 in response to the incident or the like at the intersection will be described with reference to FIG. 12.

Figure 12:
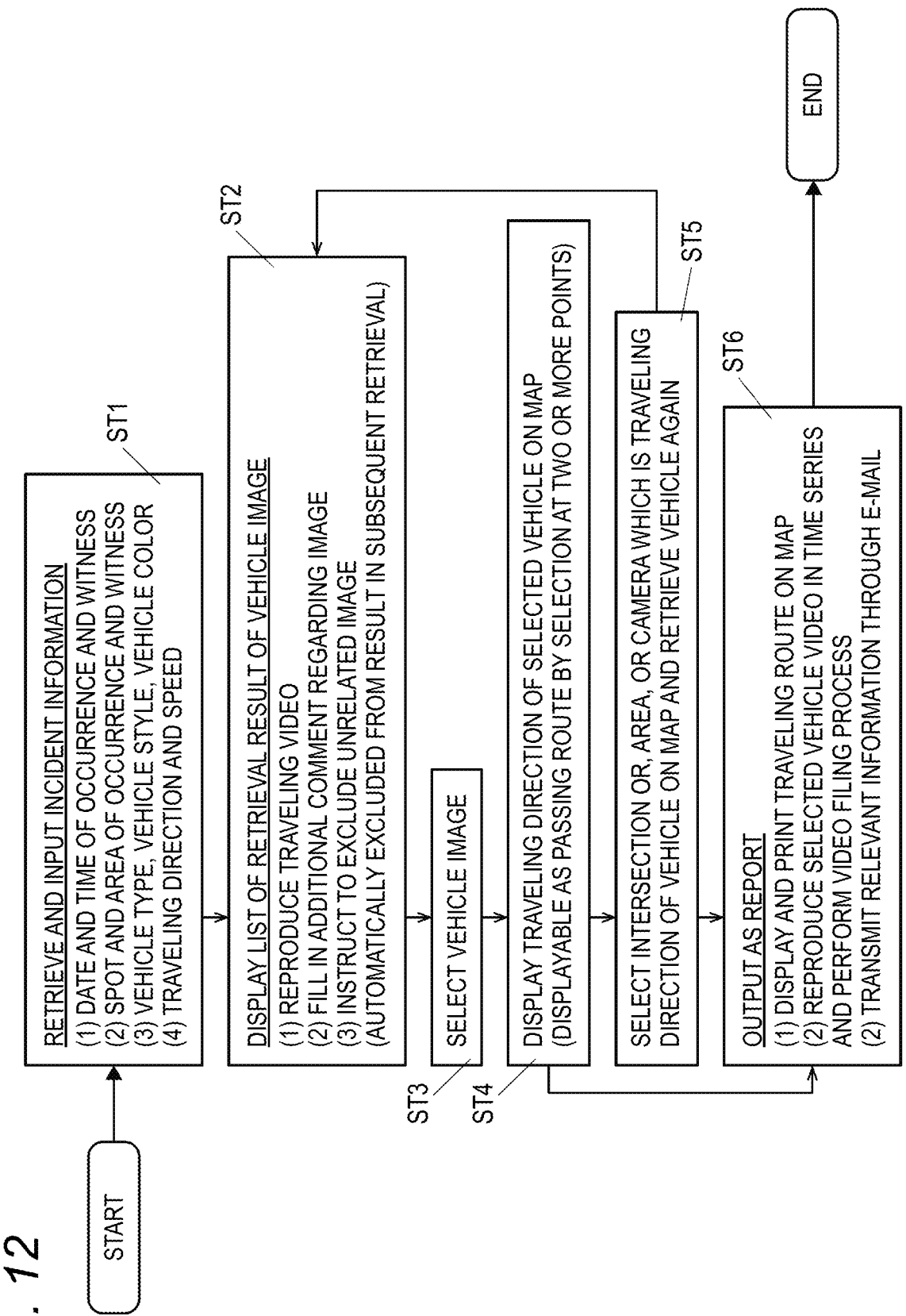
FIG. 12 is a flowchart illustrating an example of an operation procedure of creating and displaying route information on the escape route of the getaway vehicle in the recording server and the retrieval terminal according to the first embodiment.

FIG. 12 is a flow chart showing one example of a motion order for creating and displaying the route information on the escape route of the getaway vehicle in the recording server 50 and the retrieval terminal 90 according to the first embodiment. In FIG. 12, the process of the recording server 50 and the retrieval terminal 90 is explained, but the process may be understood as a process of the cloud server 70 and the retrieval terminal 90. In that case, in the following description of FIG. 12, the recording server 50 may be replaced with the cloud server 70, and the configuration corresponding to the recording server 50 may be replaced with the configuration corresponding to the cloud server 70.

In FIG. 12, the processor 92 (for example, the above-described dedicated application for getaway vehicle search) of the retrieval terminal 90 receives the input of the information (that is, the incident information) on the occurred incident by the operation of the operator responding to a call (incoming call) from the reporter, for example. The various input information is displayed on the retrieval condition input menu MN2 of FIG. 7 or the retrieval condition detail input menu AS1 of FIG. 8, for example (ST1). In step ST1, for example, the time, the place, and the area regarding the occurred incident or the incident witnessed by the reporter, the vehicle model, the vehicle type, and the vehicle color of the vehicle (that is, the getaway vehicle) causing the incident, and the traveling direction (in other words, the escape direction) and the speed (for example, the speed based on the subjectivity of the reporter, see the detailed selection item ITM4 of FIG. 8) at the time when the getaway vehicle passes the intersection are input.

The processor 92 (for example, the above-described dedicated application for getaway vehicle search) of the retrieval terminal 90 generates the retrieval key including the various information input in step ST1 and transmits the generated retrieval key to the recording server 50 through the communication unit 93 to request the image retrieval of the getaway vehicle. The recording server 50 retrieves the captured image imaging the vehicle which is the candidate of the getaway vehicle satisfying the retrieval condition defined by the retrieval key on the basis of the retrieval key transmitted from the retrieval terminal 90 with reference to the storage unit 52 or the storage unit 72.

The recording server 50 transmits the retrieval result of the captured image imaging the vehicle which is the candidate of the getaway vehicle to the retrieval terminal 90.

The processor 92 (for example, the above-described dedicated application for getaway vehicle search) of the retrieval terminal 90 receives the retrieval result of the captured image transmitted from the recording server 50 and outputs (display) the retrieval result to the output unit 94 (ST2, see FIG. 9 or 10, for example).

By the operation of the operator, the processor 92 (for example, the above-described dedicated application for getaway vehicle search) of the retrieval terminal 90 may reproduce the captured video (that is, a video) at the time when the candidate vehicle CAD temporarily selected by the operator passes the intersection on the retrieval-result display screen WD3 through magnification display or the like. Accordingly, the operator can check the video at the time when the candidate vehicle to which the operator pays attention passes the intersection, so as to easily recognize the situation.

By the operation of the operator, the processor 92 (for example, the above-described dedicated application for getaway vehicle search) of the retrieval terminal 90 may writes additionally a comment (for example, see FIG. 9) with respect to the image of the candidate vehicle CAD temporarily selected by the operator, and may stores the comment written additionally in correspondence to the information regarding the candidate vehicle CAD in the memory 95. Accordingly, the operator can store the comment to remember the elements in which the operator is anxious incidentally when seeing the image of the candidate vehicle CAD and thus can efficiently organize own memory for the image of the candidate vehicle CAD.

By the operation of the operator, when the processor 92 (for example, the above-described dedicated application for getaway vehicle search) of the retrieval terminal 90 detects the designation operation of the candidate vehicle as an excluded target for excluding the image of the vehicle which is extracted as the candidate vehicle and is apparently unrelated, for example, the processor 92 generates the information regarding the designated candidate vehicle as the excluded target to include the information in a subsequent retrieval key. Accordingly, in a step in which the operator recognizes the information on the reporter that the getaway vehicle is a blue car and is dented in parts of a bonnet, for example, the retrieval terminal 90 automatically excludes a vehicle which is not blue or is not dented in the bonnet from the target of the image retrieval in the recording server 50 so as to improve the accuracy of the image retrieval and to reduce the load of the process.

By the operation of the operator, the processor 92 (for example, the above-described dedicated application for getaway vehicle search) of the retrieval terminal 90 receives the selection operation of the image of the candidate vehicle CAD which the operator determines to be the getaway vehicle from the list of the candidate vehicle CAD displayed on the screen RLT1 of FIG. 9 or the screen RLT2 of FIG. 10, for example (ST3).

By the operation of the operator in step ST3, the processor 92 (for example, the above-described dedicated application for getaway vehicle search) of the retrieval terminal 90 displays the traveling direction (in other words, the escape direction) at the time when the selected candidate vehicle CAD passes the intersection in correspondence to the intersection to be superimposed on the road map MP1 (ST4, for example see FIG. 11).

Herein, in a case where the image retrieval of the vehicle which is the candidate of the getaway vehicle is performed with respect to at least two different intersections, and the traveling directions at the time of passing the intersections corresponding to the same candidate vehicle CAD are set (registered) in the memory 95, by the operation of the operator, the processor 92 (for example, the above-described dedicated application for getaway vehicle search) of the retrieval terminal 90 connects the arrows (for example, see FIG. 11) indicating the escape direction of the candidate vehicle (not illustrated), for example, and outputs (display) or prints the connected arrow as the escape route in the output unit 94 (ST6). Accordingly, the operator can intuitively, visually, and quickly recognize the escape route from the occurrence of the incident or the like of the candidate vehicle CAD selected by oneself, and the proper instruction at the time of the initial investigation can be given to another policeman who tracks the getaway vehicle, for example, thereby efficiently supporting the operation of the policeman.

By the operation of the operator, the processor 92 (for example, the above-described dedicated application for getaway vehicle search) of the retrieval terminal 90 time-serially may reproduce the captured video of the candidate vehicle CAD selected by the operator through the magnification display on the route output screen WD5 of FIG. 11, for example, or may generate video data for reproduction thereof to store the video data in the memory 95. Accordingly, the operator can check the aspect of the time-serial movement from the occurrence of the incident or the like of the candidate vehicle to which the operator pays attention through the video, thereby recognizing the situation more easily. In addition, the operator can check contents by instructing the reproducing process on the video data for reproduction whenever the operator is anxious.

By the operation of the operator, the processor 92 (for example, the above-described dedicated application for getaway vehicle search) of the retrieval terminal 90 may transmit the relevant information on the video (the above-described video data) or the like indicating the aspect of the time-serial movement from the occurrence of the incident or the like of the candidate vehicle to which the operator pays attention to another device through email. Accordingly, when the operator transmits the above-described video (video data) to the colleague who desires to check the video, the operation can be performed collaboratively, which contributes to the efficiency of the initial investigation.

On the other hand, the image retrieval of the vehicle which is the candidate of the getaway vehicle is not performed on at least two different intersections. In that case, by the operation of the operator, when a different intersection or area (for example, the intersection or the area in the traveling direction of the candidate vehicle) on the road map MP1 is selected, the processor 92 (for example, the above-described dedicated application for getaway vehicle search) of the retrieval terminal 90 requests again the recording server 50 to retrieve the image of the candidate vehicle using the captured video of the camera provided at the selected intersection or at the intersection in the selected area (ST5). After step ST5, the process of the recording server 50 and the retrieval terminal 90 returns to step ST2.

As described above, the investigation assist system 100 according to the first embodiment includes respective cameras of a plurality of intersections and investigation assist devices (for example, the recording server 50 or the cloud server 70 and the retrieval terminal 90) which are connected to communicate with the respective cameras. The recording server 50 or the cloud server 70 as one example of the investigation assist device records the captured video of the camera in correspondence to capturing date and time, camera information, and the intersection information together with the road map MP1 including the plurality of intersections in the storage units 52 and 72. According to the input of the information regarding the time and the intersection in which the incident or the like occurs and the information including the feature information on the vehicle which participates in the occurrence of the incident or the like, the recording server 50 or the cloud server 70 as one example of the investigation assist device retrieves the vehicle satisfying the feature information on the vehicle in the video retrieval units 53 and 73 (one example of the retrieval unit) by using the captured video of the camera specified by the camera information corresponding to the intersection. The processor 92 (one example of a list output control unit) of the retrieval terminal 90 as one example of the investigation assist device outputs the list having at least one candidate vehicle extracted by the retrieval to the output unit 94. According to the selection of at least one candidate vehicle from the list output to the output unit 94, the processor 92 (one example of a set unit) of the retrieval terminal 90 as one example of the investigation assist device stores the traveling direction at the time when the selected candidate vehicle passes the intersection in the memory 95 (one example of the storage unit) in correspondence to the selected candidate vehicle and the intersection information. The processor 92 (one example of a route output control unit) of the retrieval terminal 90 as one example of the investigation assist device outputs the traveling route of the selected candidate vehicle to the output unit 94 by using the traveling direction, which is set (registered and stored) in the memory 95 in correspondence to the same candidate vehicle, at the time of passing the intersections corresponding to the information on at least two different intersections.

Accordingly, in a case where the incident or the like occurs in the intersection where many people or vehicles come and go, the investigation assist system 100 according to the first embodiment can efficiently assist an early creation of the escape route of the getaway vehicle. In addition, the investigation assist system 100 visually shows the escape route to the operator (for example, the policeman) so as to urge the operator to recognize the escape route early. In addition, the operator can select the candidate vehicle by oneself after checking the list of the candidate vehicle, so that the getaway vehicle which causes the occurrence of the incident or the like can be refined properly, thereby accurately securing the reliability of the data of the route information on the escape route of the getaway vehicle.

Second Embodiment

The configuration of the investigation assist system according to a second embodiment is the same as the configuration of the investigation assist system 100 according the above-described first embodiment. Thus, the description of the same contents will be simplified or omitted, and different contents will be described.

FIG. 13 is a view illustrating one example of a vehicle information table TBL1 registered in the storage units 52 and 72. The vehicle information table TBL1 is normally generated by the analysis of the recording server 50 or the cloud server 70 using the captured video of the cameras provided in the intersections and is a table which stores various feature information (corresponding to a first record) from the entry to the exit of each vehicle. The vehicle information table TBL1 is stored in the storage unit 52 or the storage unit 72.

Specifically, for example, as illustrated in FIG. 13, the vehicle information table TBL1 stores the entity data corresponding to the items of an ID, an intersection, a time, a vehicle color, a vehicle type, a traveling direction, and a passing speed in each of the vehicles. The description will be given about each of the items.

The ID is a number plate as an identification number of the vehicle, for example. A hyperlink is provided as illustrated in FIG. 13. The information on the number plate can be extracted by the analysis (see the above description) of the captured video. The processor PRC1 or the processor PRC2 can obtain the thumbnail of the vehicle corresponding to the ID by accessing the access destination (for example, the storage destination of the data of the thumbnail to be described later) corresponding to the hyperlink. Incidentally, the thumbnail is a best shot image which is generated through a known technique using the captured video of the camera by the recording server 50 or the cloud server 70, for example. Incidentally, in the line (column) of the ID, the hyperlinks corresponding to the respective IDs of the vehicles may not be provided, and the data of the thumbnail or the line of the storage destination may be added instead.

The intersection is intersection information for identifying the intersection which the vehicle passes. The intersection information is information on an intersection corresponding to the camera information on the camera which captures the captured video as the target of the analysis (see the above description).

The time is year, month, day, and time in which the entry of the vehicle into the intersection is detected during the analysis (see the above description).

The vehicle color is color of the vehicle. The information on the vehicle color is color information on the vehicle detected during the analysis (see the above description).

The vehicle type is a type (for example, a sedan, a truck, and a wagon) of the vehicle. The information on the vehicle type is information on the type corresponding to the style of the vehicle detected during the analysis (see the above description).

The traveling direction indicates a direction in which the vehicle enters and exits the intersection. The information on the traveling direction is extracted to correspond to the advancing direction of the vehicle detected during the analysis (see the above description). As explained with reference to FIG. 17, the traveling direction corresponds to the escape direction of the candidate vehicle of the getaway vehicle of each of the intersections.

The passing speed indicates a speed at which the vehicle passes the intersection. The passing speed is calculated on the basis of the elapsed time from the entry time to the exit time of the intersection and the distance between the entry position and the exit position of the intersection during the analysis (see the above description). For example, in a case where the passing speed exceeds the legal speed limit according to roads (such as a general road and a freeway), there is a strong possibility to be the candidate vehicle of the getaway vehicle.

For example, as for the vehicle of ID "1101", it is extracted by the analysis (see the above description) that the vehicle is a two-door sedan having red color and travels an intersection As1 at 21:00 on Feb. 12, 2018 at 70 km/h by a right turn from the south to the east.

For example, as the vehicle of ID "1102", it is extracted by the analysis (see the above description) that the vehicle is a four-door wagon having white color and travels an intersection Bs1 at 17:00 on Feb. 13, 2018 at 70 km/h straight from the north to the south.

For example, as for the vehicle of ID "1103", it is extracted by the analysis (see the above description) that the vehicle is a two-door sedan having blue color and travels an intersection Cs1 at 19:00 on Feb. 14, 2018 at 70 km/h straight from the west to the east.

Figure 14:
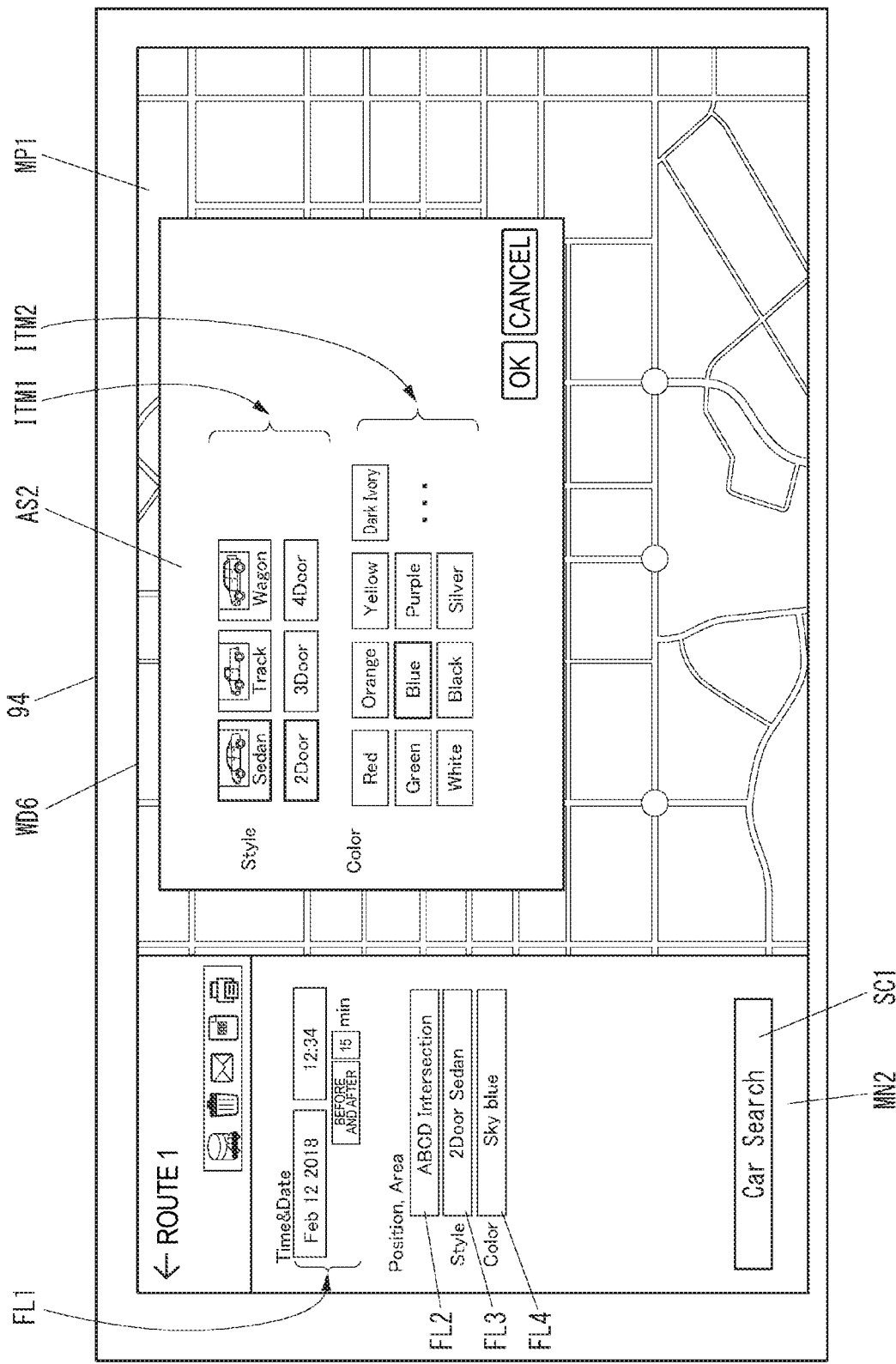
FIG. 14 is a view illustrating an example of a retrieval condition detail input menu for inputting detailed retrieval conditions of the candidate vehicle.

FIG. 14 is a view illustrating one example of a retrieval condition detail input menu AS2 for inputting a detailed retrieval condition of the candidate vehicle.

Similarly to the retrieval condition detail input menu AS1 illustrated in FIG. 8, the retrieval condition detail input menu AS2 is displayed on the output unit 94 of the retrieval terminal 90 on the basis of the operation of the operator (that is, the policeman) using the retrieval terminal 90 in the police station, for example. The retrieval condition detail input menu AS2 is one example of the display screen of the dedicated application for getaway vehicle search which is installed in the retrieval terminal 90 in advance, for example, and is displayed to be superimposed on the road map MP1 of a retrieval condition input screen WD6. The retrieval condition input menu MN2 illustrated in FIG. 14 is the same as the retrieval condition input menu MN2 illustrated in FIG. 7 or 8 other than the described contents of the capturing time input field FL1, and thus the description of the retrieval condition input menu MN2 will be omitted.

The retrieval condition detail input menu AS2 includes the detailed selection item ITM1 of the style (Style) indicating the style of the vehicle, the detailed selection item ITM2 of the vehicle color (Color) indicating the color of the vehicle, the OK button, and the cancel button. Incidentally, in the detailed selection item ITM1 of FIG. 8 or 14, a sedan, a truck, a wagon, a two-door vehicle, a three-door vehicle, and a four-door vehicle are exemplarily illustrated as the style. However, it is a matter of course that the invention is not limited thereto. Similarly, in the detailed selection item ITM2 of FIG. 8 or 14, red, orange, yellow, dark ivory, green, blue, purple, white, black, and silver are exemplarily illustrated as the vehicle color. However, it is a matter of course that the invention is not limited thereto.

Figure 15:
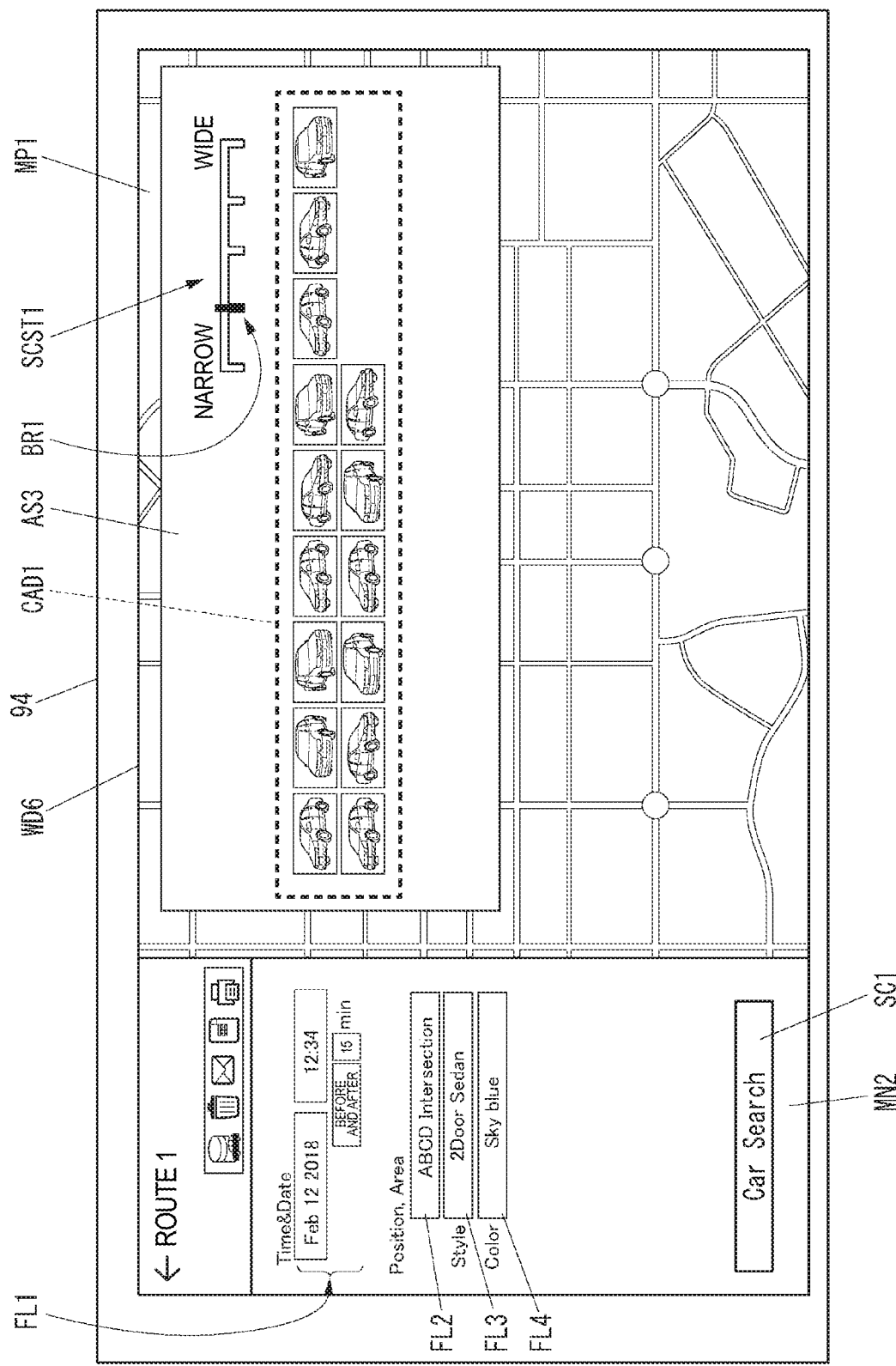
FIG. 15 is a view illustrating an example of an extraction result confirmation menu from which a plurality of candidate vehicles are extracted.
Figure 16:
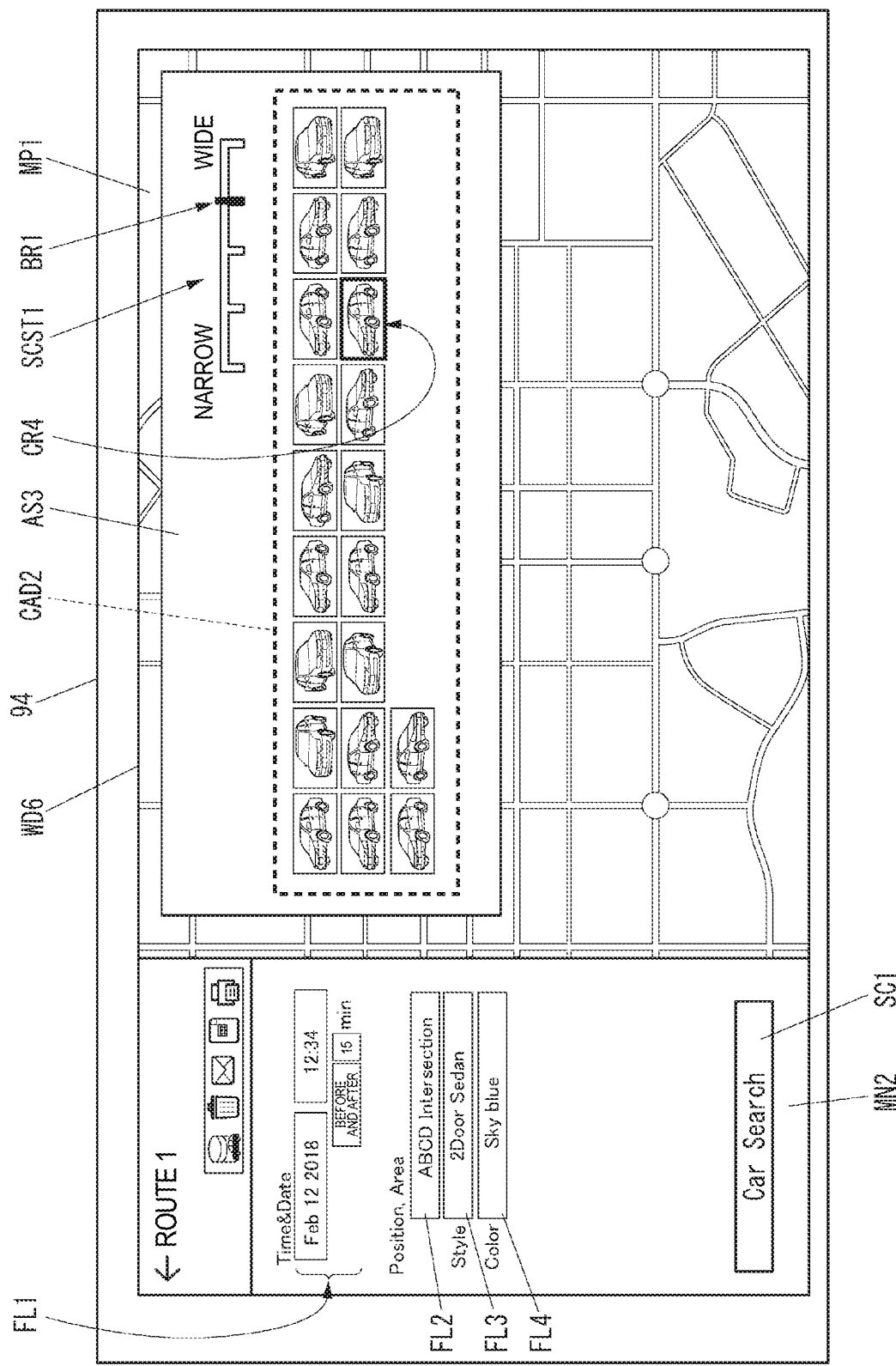
FIG. 16 is a view illustrating an example of an extraction result confirmation menu from which a plurality of candidate vehicles are extracted.

FIGS. 15 and 16 are views illustrating one example of extraction-result check menus AS3 and AS4 in which a plurality of candidate vehicles are extracted. In the description of FIGS. 15 and 16, the duplicated contents with the descriptions of FIGS. 7, 8, and 14 will be described simply or omitted by denoting the same reference numerals, and different contents will be described.

On the output unit 94 of the retrieval terminal 90, the extraction-result check menu AS3 illustrated in FIG. 15 is displayed as the result of the retrieval process of the recording server 50 or the cloud server 70 based on the push-down operation of the retrieval button SC1 illustrated in FIG. 14 performed by the operator (that is, the policeman) using the retrieval terminal 90 in the police station, for example. On the output unit 94 of the retrieval terminal 90, an extraction-result check menu AS4 illustrated in FIG. 16 is displayed as the result of the retrieval process of the recording server 50 or the cloud server 70 based on the moving operation of an adjusting bar BR1 with respect to the retrieval-accuracy status bar SCST1 illustrated in FIG. 15 and the push-down operation of the retrieval button SC1 performed by the operator (that is, policeman) using the retrieval terminal 90 in the police station, for example.

For example, a list CAD1 (list) of the thumbnail of the vehicles (for example, fifteen candidate vehicles of the getaway vehicle) conforming to the various information designated in the retrieval condition input menu MN2 (see FIG. 14) by the operation of the operator is displayed (output) on the extraction-result check menu AS3 illustrated in FIG. 15. The retrieval-accuracy status bar SCST1 and the adjusting bar BR1 for finely adjusting the adaptation degrees of the various information designated in the retrieval condition input menu MN2 are displayed on the extraction-result check menu AS3 (see FIG. 14). The retrieval-accuracy status bar SCST1 defines five levels of retrieval accuracy, for example. Specifically, the retrieval-accuracy status bar SCST1 designates any one in a range from the retrieval (that is, from the retrieval which requires a strict conformity) with high retrieval accuracy to the retrieval (that is, the retrieval which does not require the strict conformity) with low retrieval accuracy by gradually lowering the retrieval accuracy through the adjusting bar BR1. In FIG. 15, a relatively strict retrieval accuracy is designated by the adjusting bar BR1.

The operator sees the list of the vehicle which is displayed in the list CAD1 of the thumbnail illustrated in FIG. 15 and determines that there is no vehicle which is the vehicle (for example, the getaway vehicle) matching the contents of the report, for example. Then, by the operation of the operator, the adjusting bar BR1 is designated such that the retrieval accuracy is stricter by two levels (in other words, the retrieval accuracy is lowered).

Herein, the retrieval accuracy is described simply by using the color of the vehicle as an example.

For example, in a case where the color of the vehicle is designated to be blue, the color (for example, sky blue and ultramarine blue) which is close to blue is included in the retrieval key when the retrieval accuracy is lowered. On the other hand, for example, in a case where the blue is designated as the color of the vehicle, only the blue is included in the retrieval key when the retrieval accuracy is raised.

The processor 92 (for example, the above-described dedicated application for getaway vehicle search) of the retrieval terminal 90 generates the retrieval key including the retrieval accuracy indicated by the changed adjusting bar BR1 as a parameter according to the operation of the adjusting bar BR1 by the operator, and transmits the retrieval request including the retrieval key to the recording server 50 or the cloud server 70 through the communication unit 93. The result of the retrieval process based on the retrieval request in the recording server 50 or the cloud server 70 is transmitted to the retrieval terminal 90.

The processor 92 (for example, the above-described dedicated application for getaway vehicle search) of the retrieval terminal 90 displays (output) the result (specifically, the various information designated in the retrieval condition input menu MN2 (see FIG. 14) and a list CAD2 of the thumbnails of twenty vehicles conforming to the retrieval accuracy (see FIG. 16) designated in the adjusting bar BR1) of the retrieval process in the recording server 50 or the cloud server 70 as the extraction-result check menu AS4 illustrated in FIG. 16 on the output unit 94.

In a case where the operator determines that the vehicle which is the vehicle matching the contents of the report is included in these twenty vehicles, for example, the corresponding vehicle CR4 is designated and selected by the operation of the operator.

Next, in the investigation assist system 100 according to the second embodiment, a first example of the display of the escape direction in which the candidate vehicle retrieved and extracted among the candidates of the getaway vehicle passes the intersection will be described with reference to FIGS. 17 and 18.

Figure 17:
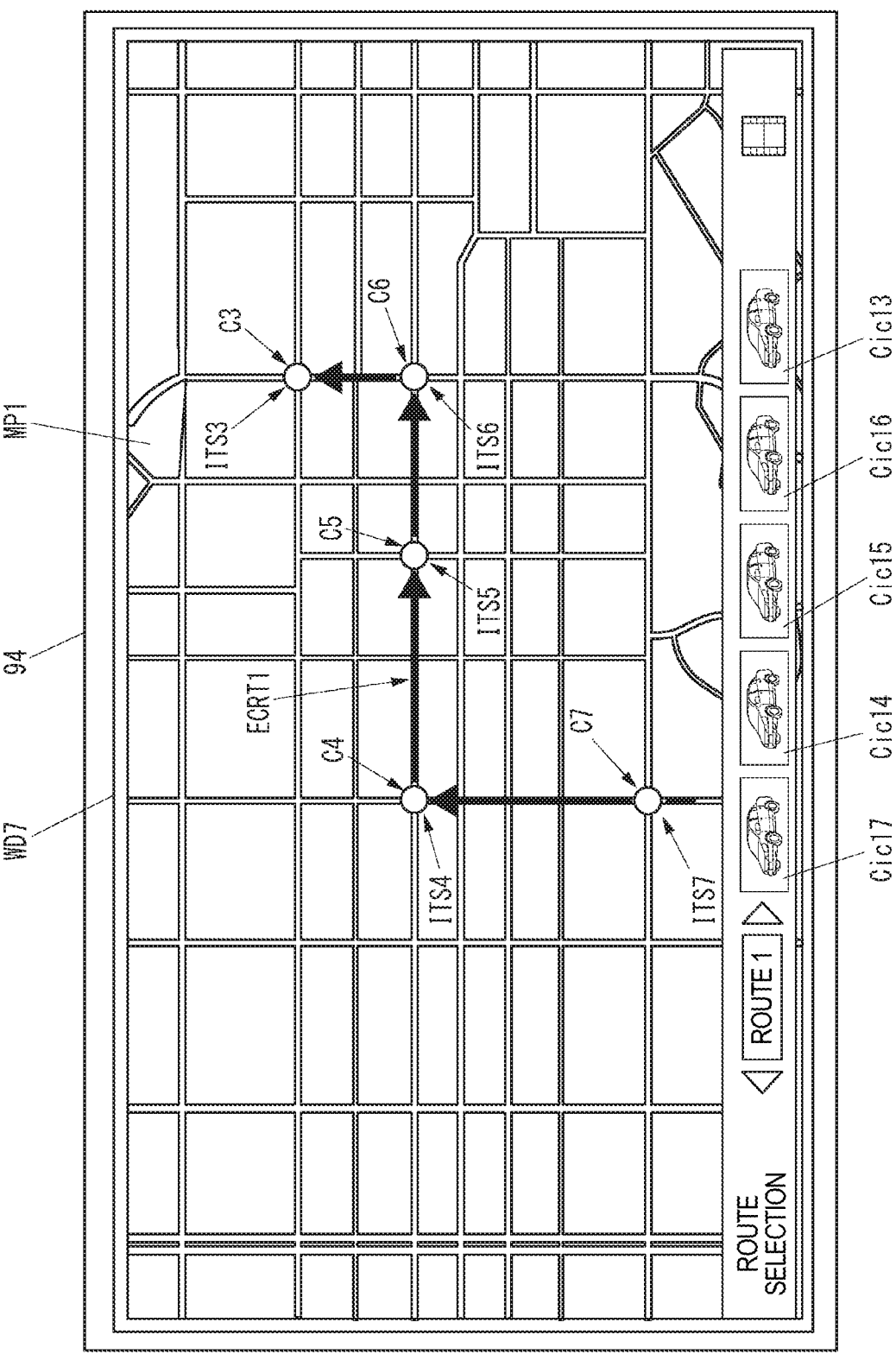
FIG. 17 is a view illustrating an example of an escape direction output screen for presenting an escape route specified by an escape direction for each intersection existing on the escape route of one candidate vehicle.

FIG. 17 is a view illustrating one example of an escape direction output screen WD7 for showing the escape route which is specified by the escape directions at the intersections present on the escape route of one candidate vehicle. FIG. 18 is a flow chart showing a first example of the motion order for displaying the escape direction in which the candidate vehicle retrieved and extracted among the candidates of the getaway vehicle passes the intersection in the recording server 50 and the retrieval terminal 90 according to the second embodiment.

As for the escape direction output screen WD7, for example, on the basis of the operation of the operator (that is, the policeman) using the retrieval terminal 90 in the police station, the screen data which is generated as the result of the process (see FIG. 18) in the recording server 50 or the cloud server 70 is transmitted to the retrieval terminal 90 to be displayed on the output unit 94 of the retrieval terminal 90. Incidentally, the escape direction output screen WD7 may be not generated in the recording server 50 or the cloud server 70, but may be generated by the processor (for example, the above-described dedicated application for getaway vehicle search) of the retrieval terminal 90 by using the retrieval result (see the following description) from the recording server 50 or the cloud server 70. The escape direction output screen WD7 is one example of the display screen of the dedicated application for getaway vehicle search installed the retrieval terminal 90 in advance, for example.

In the escape direction output screen WD7, in a case where at least one vehicle conforming to the retrieval condition (the retrieval key) described with reference to FIGS. 14, 15, and 16 is selected by the operation of the operator, the escape route ECRT1 of the selected vehicle is shown to be identifiable. The escape route ECRT1 of the vehicle is generated in such a manner that the processor 92 (for example, the above-described dedicated application for getaway vehicle search) of the retrieval terminal 90 extracts the traveling direction of each of the intersections from the vehicle information table TBL1 (see FIG. 13) corresponding to the selected vehicle, and connects the traveling directions at the intersections.

For example, the escape route ECRT1 indicates that the vehicle (for example, the candidate vehicle of the getaway vehicle) selected by the operator gets away along the traveling route. Specifically, it is shown that the vehicle travels the intersection ITS7 provided with the camera C7 straight from the south to the north, travels the intersection ITS4 provided with the camera C4 by a right turn from the south to the east, travels the intersection ITS5 provided with the camera C5 straight from the west to the east, travels the intersection ITS6 provided with the camera C6 by a left turn from the west to the north, and reaches the intersection ITS3 provided with the camera C3.

In the escape direction output screen WD7, a series of icons Cic17, Cic14, Cic15, Cic16, and Cic13 of the thumbnails which are generated on the basis of the captured video at the time when the vehicle (that is, the candidate vehicle of the getaway vehicle) which is escaped along the above-described escape route ECRT1 passes the intersections are displayed (output) in correspondence to the escape route ECRT1.

In the following description in FIG. 18, an example executed in the recording server 50 will be described so as to simplify the description, and, alternatively, the example may be also executed in the cloud server 70 in the same manner as that of the recording server 50. In that case, the recording server 50 described hereinafter may be replaced by the cloud server 70, the processor PRC1 described hereinafter may be replaced by the processor PRC2, the communication unit 51 described hereinafter may be replaced by the communication unit 71, and further, the storage unit 52 may be replaced by the storage unit 72.

Figure 18:
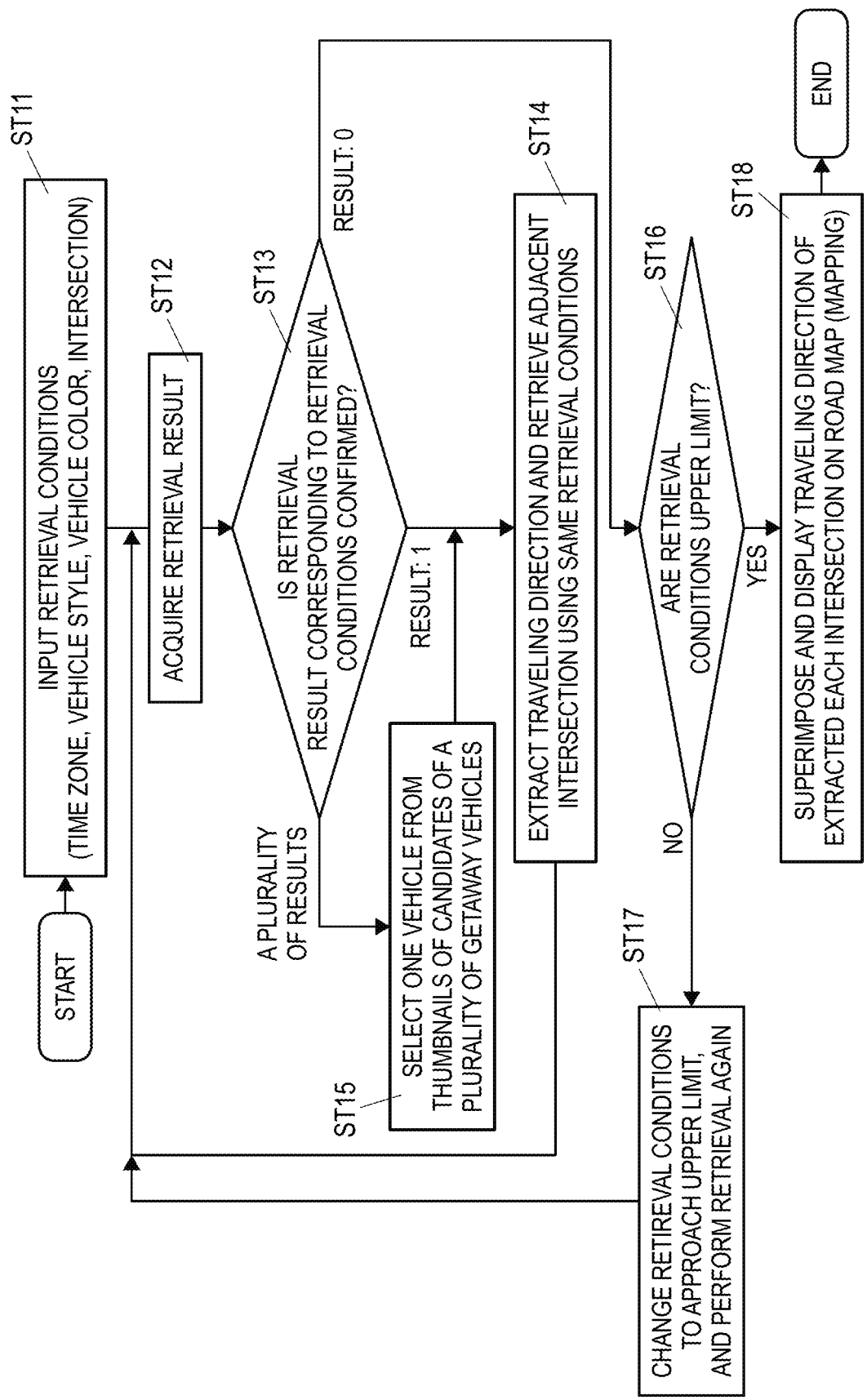
FIG. 18 is a flowchart illustrating a first example of an operation procedure, in a recording server and a retrieval terminal according to a second embodiment, of retrieving a candidate for a getaway vehicle and displaying an escape direction when the extracted candidate vehicle passes through an intersection.

In FIG. 18, retrieval conditions (for example, a time zone, a vehicle style, a vehicle color, and an intersection) are inputted and designated by operation of an operator, for example, with the method described with reference with FIG. 14 at Step ST11. The processor 92 of the retrieval terminal 90 (for example, the above-described dedicated application for getaway vehicle search) generates a retrieval key (one example of the retrieval conditions) including inputted contents with respect to respectively designated items according to the designation of step ST11, generates a vehicle retrieval request including the retrieval key, and transmits the generated vehicle retrieval request to the recording server 50 through the communication unit 93. Further, additional information, for example, such as a scratch on a bonnet of the vehicle, and the like may be used as the retrieval key at step ST11.

When the processor PRC1 of the recording server 50 acquires the retrieval request transmitted from the retrieval terminal 90, since it is determined whether vehicle data that match the retrieval key (that is, satisfy the retrieval key) included in the retrieval request exist or not, the vehicle information table TBL1 stored in the storage unit 52 is retrieved. The processor PRC1 of the recording server 50 transmits a retrieval result (for example, information on the vehicle matching the retrieval key) to the retrieval terminal 90 through the communication unit 51. The information on the vehicle includes, for example, various types of information indicated in the vehicle information table TBL1 illustrated in FIG. 13 and thumbnail data of the vehicle. The processor 92 of the retrieval terminal 90 (for example, the above-described dedicated application for getaway vehicle search) acquires the retrieval result (see the above description) transmitted from the recording server 50 at step ST12.

The processor 92 (for example, the above-described dedicated application for getaway vehicle search) determines the number of retrieval results (see the above description) corresponding to the retrieval conditions of step ST11 (in other words, the number of records of the vehicle information table TBL1 illustrated in FIG. 13) at step ST13. When the retrieval results are zero at step (ST13, 0 result) (that is, there exists no vehicle matching the retrieval conditions of step ST11), the processor 92 (for example, the above-described dedicated application for getaway vehicle search) proceed to step ST16.

Further, when there exist a plurality of the retrieval results (see the above description) at step (ST13, a plurality of results), the processor 92 (for example, the above-described dedicated application for getaway vehicle search), for example, as described in FIGS. 15 and 16, displays (outputs) information on the vehicle (for example, the thumbnail data of the vehicle extracted by the retrieval) corresponding to the retrieval results (see the above description) on the output unit 94. Either one of the thumbnails of the candidate vehicles of the plurality of getaway vehicles displayed on the output unit 94 is selected by the operation of an operator at step ST15.

After either one of the thumbnails is selected at step ST15, or when one of the retrieval results (see the above description) acquired at step ST12 is obtained, the processor 92 (for example, the above-described dedicated application for getaway vehicle search) extracts a traveling direction of the vehicle included in the retrieval results at step ST14. Further, the processor 92 (for example, the above-described dedicated application for getaway vehicle search) is changed to an intersection adjacent to the intersection included in the retrieval results, and a similar retrieval request is generated with respect to the changed intersection as a target by using the retrieval conditions of step ST11 (however, intersection information is excluded), after which the generated retrieval request is transmitted to the recording server 50 through the communication unit 93. When the processor PRC 1 of the recording server 50 acquires the retrieval request transmitted from the retrieval terminal 90, since it is determined whether there exist the vehicle data matching the retrieval key (that is, satisfy the retrieval key) included in the retrieval request or not in the same manner, the vehicle information table TBL1 stored in the storage unit 52 is retrieved. Since the operation of transmitting (responding to) the retrieval results to the retrieval terminal 90 is described hereinabove, the same description will be omitted.

Retrieval processing using the retrieval conditions (however, the intersection information is excluded) of step ST11 with respect to the adjacent intersection as a target is repeatedly executed until the retrieval results in the recording server 50 become 0 (zero) result at step ST13. In other words, the retrieval processing in the recording server 50 continues until the vehicle (that is, the candidate vehicle of the getaway vehicle) matching the same retrieval conditions (however, the intersection information is excluded) continuously appears at the adjacent intersections one after another, whereby the traveling direction of the vehicle at each intersection is automatically extracted by the recording server 50 and is transferred to the retrieval terminal 90.

When the retrieval results at step ST13 are 0 (zero) result at step (ST13, 0 result), the processor 92 (for example, the above-described dedicated application for getaway vehicle search) determines whether the retrieval conditions at step ST11 is a predetermined upper limit or not at step ST16. The upper limit of retrieval conditions is, for example, a fixed time width (for example, about 20 minutes before and after)

inputted to the capturing time input column FL1, and is stored in the memory 95 of the retrieval terminal 90 as predetermined setting information.

When it is determined that the retrieval conditions at step ST11 is not the predetermined upper limit at step (ST16, NO), the processor 92 (for example, the above-described dedicated application for getaway vehicle search) generates the retrieval key for performing the retrieval again by changing the retrieval conditions at step ST11 so as to approach the predetermined upper limit at Step ST17, and generates the vehicle retrieval request including the retrieval key, after which the generated vehicle retrieval request is transmitted to the recording server 50 through the communication unit 93. When the processor PRC1 of the recording server 50 acquires the retrieval request transmitted from the retrieval terminal 90, since the processor PRC1 thereof determines whether the vehicle data matching the retrieval key (that is, satisfy the retrieval key) included in the retrieval request exist or not in the same manner, the vehicle information table TBL1 stored in the storage unit 52 is retrieved. Since the operation of transmitting (responding to) the retrieval results to the retrieval terminal 90 is described hereinabove, the same descriptions will be omitted.

On the other hand, when the processor 92 (for example, the above-described dedicated application for getaway vehicle search) determines that the retrieval conditions at step ST11 are the predetermined upper limit at step (ST16, YES), the traveling direction of the vehicle (refer to the escape route ECRT1 in FIG. 17) at each intersection extracted at step ST14 is superimposed on a position of the corresponding intersection on the road map MP1 of the escape direction output screen WD7 (refer to FIG. 17), thereby being displayed at step (ST18, mapping).

Next, in the investigation assist system 100 according to the second exemplary embodiment, a second example with respect to retrieval of the candidate vehicle of the getaway vehicle and display of the escape direction at the time when the extracted candidate vehicle passes through the intersection will be described with reference to FIGS. 17, 19, and 20.

Figure 19:
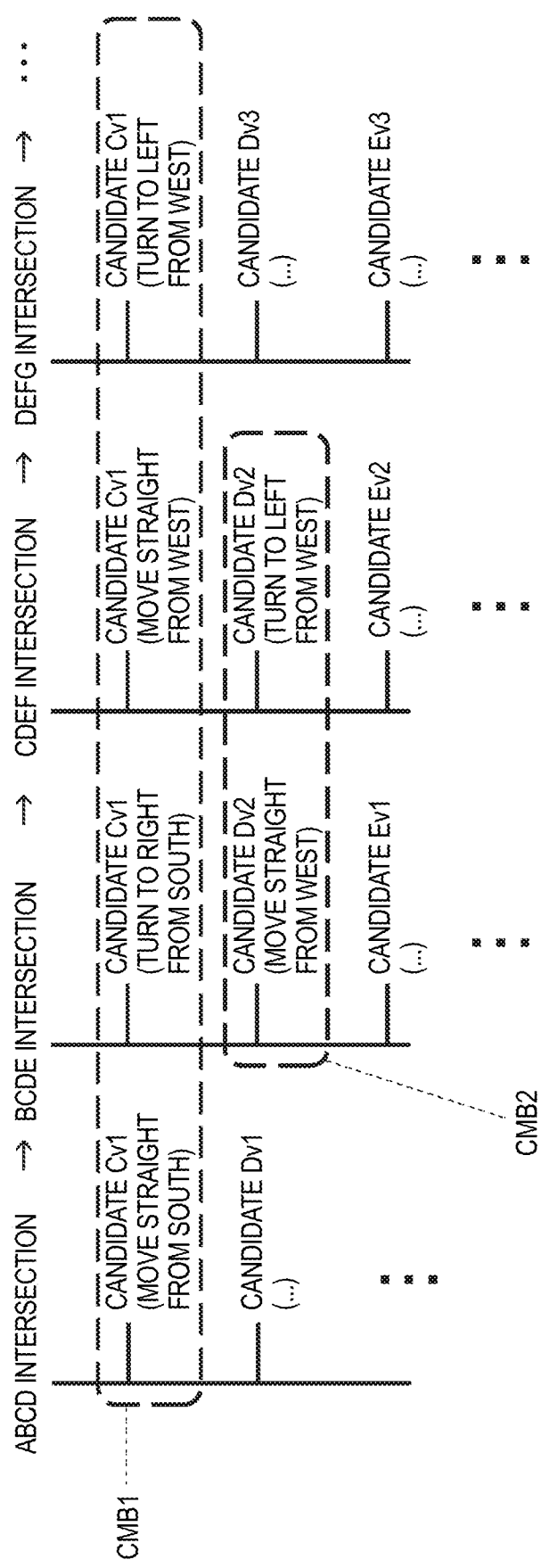
FIG. 19 is a view schematically illustrating an example of candidate vehicle logic data indicating the relevance of the extracted candidate vehicle for each intersection when all the intersections are collectively retrieved.

FIG. 19 is a view schematically illustrating one example of candidate vehicle logic data showing association of the candidate vehicle extracted at each intersection when all of the intersections are collectively retrieved. FIG. 20 is a flow chart illustrating a second example of retrieving the candidate vehicle of the getaway vehicle and of displaying the escape direction when the extracted candidate vehicle passes through the intersection in the recording server 50 and the retrieval terminal 90 according to the second exemplary embodiment.

Figure 20:
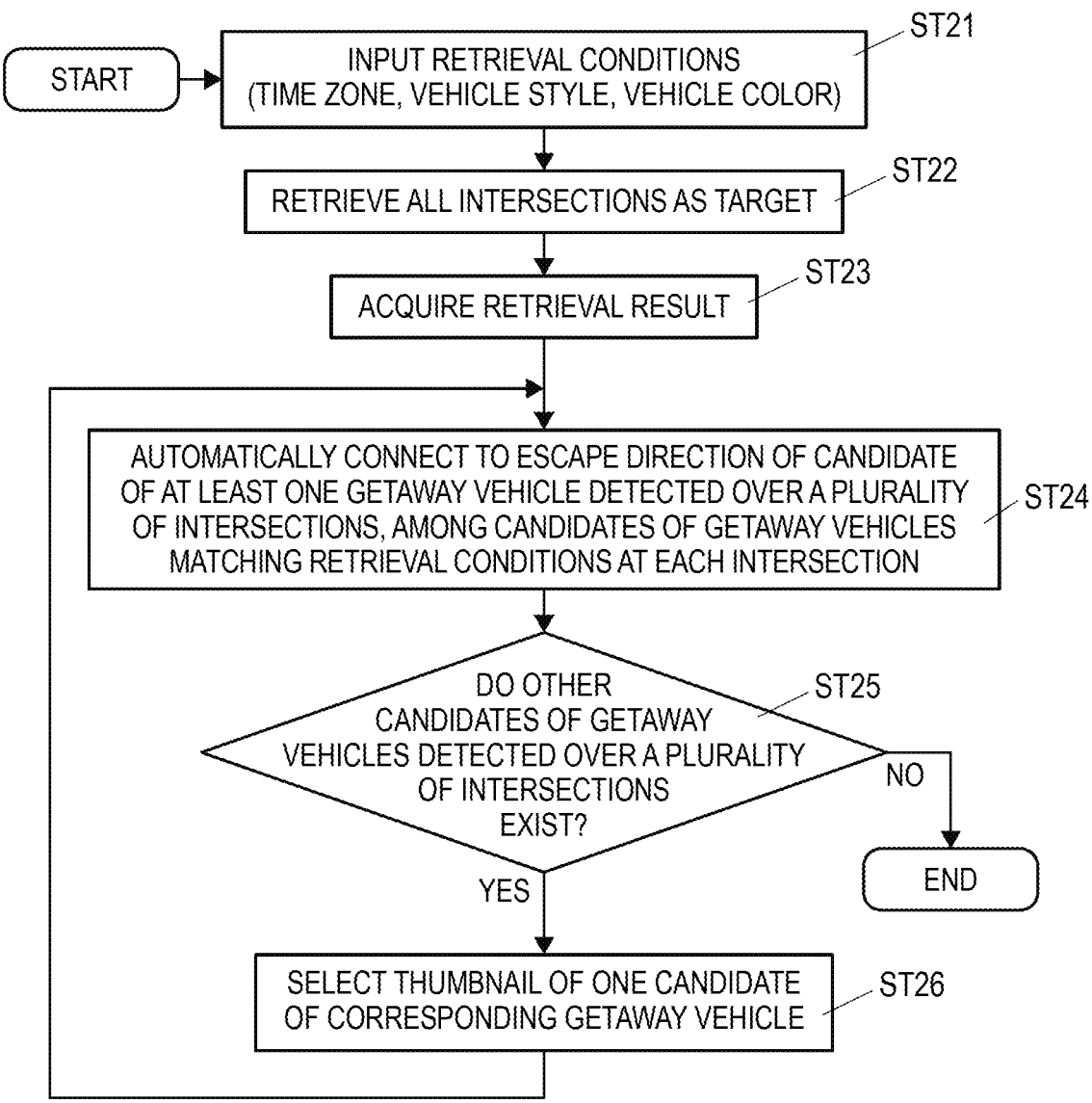
FIG. 20 is a flowchart illustrating a second example of an operation procedure, in the recording server and the retrieval terminal according to the second embodiment, of retrieving a candidate for a getaway vehicle and displaying an escape direction when the extracted candidate vehicle passes through an intersection.

The candidate vehicle logic data illustrated in FIG. 19 are generated by the processor PRC1 of the recording server 50 or the processor PRC2 of the cloud server 70 when all of the intersections to be described by referring to FIG. 20 are collectively retrieved, and are temporarily stored in the memory 57 or 77. The candidate vehicle logic data are data that store information in association with the vehicle (that is, the candidate vehicle of the getaway vehicle) matching the retrieval conditions (refer to step ST21 in FIG. 20) and the traveling direction when the vehicle passes through the intersection at each intersection.

For example, at an ABCD intersection, the recording server 50 or the cloud server 70 analyzes a captured video of a camera installed at the ABCD intersection, whereby a candidate Cv1, which is the candidate vehicle of the getaway vehicle (abbreviated as "candidate" in the description of FIG. 19), is extracted as the candidate Cv1 which went straight from the south to the north and a candidate Dv1 (description of the traveling direction is omitted) is extracted.

Further, for example, at a BCDE intersection adjacent to the ABCD intersection, the recording server 50 or the cloud server 70 analyzes a captured video of a camera installed at the BCDE intersection, whereby a candidate Cv1 is extracted as the candidate Cv1 which turned from the south to the left, a candidate Dv2 is extracted as the candidate Dv2 which went straight from the west to the east, and a candidate Ev1 (description of the traveling direction is omitted) is extracted.

Further, for example, at a CDEF intersection adjacent to the BCDE intersection, the recording server 50 or the cloud server 70 analyzes a captured video of a camera installed at the CDEF intersection, whereby a candidate Cv1 is extracted as the candidate Cv1 which went straight from the west to the east, a candidate Dv2 is extracted as the candidate Dv2 which turned from the west to the north, and a candidate Ev2 (description of the traveling direction is omitted) is extracted.

Further, for example, at a DEFG intersection adjacent to the CDEF intersection, the recording server 50 or the cloud server 70 analyzes a captured video of a camera installed at the DEFG intersection, whereby a candidate Cv1 is extracted as the candidate Cv1 which turned from the west to the north, and candidates Dv3 and Ev3 (descriptions of the traveling directions are omitted) are respectively extracted.

Therefore, when a retrieval key in which a specific intersection point is not designated is transmitted from the retrieval terminal 90, the recording server 50 or the cluster server 70 generates the candidate vehicle logic data illustrated in FIG. 19 when collectively retrieving all of the intersections, thereby respectively extracting sets CMB1 and CMB2 in the traveling directions at each intersection of the same candidates Cv1 and Dv2.

In the following description in FIG. 20, the example executed in the recording server 50 will be described so as to simplify the description, and, alternatively, the example may be executed in the cloud server 70 in the same manner as that of the recording server 50. In that case, the recording server 50 described hereinafter may be replaced by the cloud server 70, the processor PRC1 described hereinafter may be replaced by the processor PRC2, the communication unit 51 described hereinafter may be replaced by the communication unit 71, and further, the storage unit 52 may be replaced by the storage unit 72.

In FIG. 20, the retrieval conditions (for example, a time zone, a vehicle style, and a vehicle color) are inputted and designated by the operation of the operator, for example, with the method described with reference with FIG. 14 at Step ST21. The processor 92 of the retrieval terminal 90 (for example, the above-described dedicated application for getaway vehicle search) generates a retrieval key (one example of the retrieval conditions) including inputted contents with respect to respectively designated items according to the designation of step ST21, generates a vehicle retrieval request including the retrieval key, and transmits the generated vehicle retrieval request to the recording server 50 through the communication unit 93.

When the processor PRC1 of the recording server 50 acquires the retrieval request transmitted from the retrieval terminal 90, since it is determined whether vehicle data that match the retrieval key (that is, satisfy the retrieval key) included in the retrieval request exist or not with respect to all of the intersections as a target, the vehicle information table TBL1 stored in the storage unit 52 is retrieved at step ST22. The processor PRC1 of the recording server 50 transmits a retrieval result (for example, information on the vehicle matching the retrieval key) to the retrieval terminal 90 through the communication unit 51. The information on the vehicle includes, for example, various types of information illustrated in the vehicle information table TBL1 illustrated in FIG. 13 and the thumbnail data of the vehicle. The processor 92 of the retrieval terminal 90 (for example, the above-described dedicated application for getaway vehicle search) acquires the retrieval result (see the above description) transmitted from the recording server 50 at step ST23.

The processor 92 (for example, the above-described dedicated application for getaway vehicle search) automatically connects the escape direction of the candidate vehicle of at least one getaway vehicle detected over a plurality of intersections (refer to the set CMB1 of the traveling direction in FIG. 19) at step ST24, among the candidates of the getaway vehicles at each intersection matching the retrieval conditions designated at step ST21. The processor 92 (for example, the above-described dedicated application for getaway vehicle search) superimposes a result of automatic connection at step ST24 (refer to the escape route ECRT1 in FIG. 17) on a position of the corresponding intersection on the road map MP1 of the escape direction output screen WD7 (refer to FIG. 17), thereby displaying the result thereof at step (ST24, mapping).

The processor 92 (for example, the above-described dedicated application for getaway vehicle search) determines whether other candidate vehicles of the getaway vehicles detected over a plurality of intersections exist or not at step ST25, among the retrieval results acquired at step ST23. When it is determined that there exists no candidate vehicle of the getaway vehicles detected over the plurality of intersections at step (ST25, NO), the processing of the processor 92 (for example, the above-described dedicated application for getaway vehicle search) is terminated.

On the other hand, when it is determined that there exist other candidate vehicles of the getaway vehicles detected over the plurality of intersection at step (ST25, YES), the processor 92 (for example, the above-described dedicated application for getaway vehicle search), for example, as described in FIG. 15, displays (outputs) the thumbnails of the candidate vehicles of at least one another getaway vehicle on the output unit 94. The thumbnail of one vehicle is selected from the thumbnails of the candidate vehicles of at least one another getaway vehicle displayed on the output unit 94 by the operation of the operator at step ST26.

The processor 92 (for example, the above-described dedicated application for getaway vehicle search) extracts the escape direction (refer to the set CMB1 of traveling direction in FIG. 19) of the candidate vehicle selected according to the selection of a step ST26 and is automatically connected to the selected candidate vehicle, and superimposes the result of the automatic connection (refer to the escape route ECRT1 in FIG. 17) on the position of the corresponding intersection on the road map MP1 of the escape direction output screen WD7 (refer to FIG. 17), thereby displaying the result thereof at step (ST24, mapping). That is, the processing of steps ST25→ST26→ST24 is repeated by the amount of the existence of the candidate vehicles of the getaway vehicles detected over the plurality of intersections.

As described above, the investigation assist system 100 according to the second exemplary embodiment includes a plurality of cameras respectively installed at a plurality of intersections and the recording server 50 or the cloud server 70 (an example of the investigation assist device) communicably connected to the plurality of cameras. The recording server 50 and the cloud server 70 are provided with the processors PRC1 and PRC2 and the storage units 52 and 72 that record captured videos of respective cameras in association with a capturing date, camera information, intersection information as well as road map information including a plurality of intersections. The processors PRC1 and PRC2 retrieve at least one vehicle satisfying the retrieval conditions by using the respectively captured videos of the plurality of cameras according to the designation of the retrieval conditions including information on the date and time when an accident, and the like occurred, and feature information on a vehicle (for example, a getaway vehicle) causing the accident, and the like. The processors PRC1 and PRC2 transmit the retrieval result (see the above description) to the retrieval terminal 90 as one example of the investigation assist device to the retrieval terminal 90. The processor 92 provided in the retrieval terminal 90 as one example of the investigation assist device extracts the traveling direction at the time when at least one vehicle respectively passes through the plurality of intersections at each intersection from the retrieval result transmitted from the recording server 50 or the cloud server 70. The processor 92 provided in the retrieval terminal 90 as one example of the investigation assist device superimposes the traveling route of the vehicle on a position on a road map MP2 based on the traveling direction extracted at each intersection and outputs the superimposed traveling route to the output unit 94.

Accordingly, the investigation assist system 100 can estimate the escape route used for the escape of the candidate vehicle with high accuracy by using the traveling direction of each intersection of the candidate vehicle of the getaway vehicle on which a person causing the accident, and the like rides. Since the investigation assist system 100 can output the escape route of the candidate vehicle of the getaway vehicle to the output unit 94, it is possible to efficiently support the preparation of the escape route of the getaway vehicle by the operator of the police station, thereby making it possible to visually present the escape route to those involved in the accident, and the like including the operator (for example, a policeman) and to grasp the escape route at an early stage.

Further, the processors PRC1 and PRC2 of the recording server 50 or the cloud server 70 analyze the feature information on the vehicle passing through the intersection where the cameras are installed by using the respective captured video data of the plurality of cameras, and the vehicle information table TBL1 in which the analysis result is collected for each vehicle is registered in the storage units 52 and 72. Accordingly, the recording server 50 or the cloud server 70 can appropriately and easily extract the candidate vehicle of the getaway vehicle which can match the retrieval key included in the retrieval request transmitted from the retrieval terminal 90 based on the operation of the operator.

The processor 92 provided in the retrieval terminal 90 as one example of the investigation assist device outputs information (for example, information on the vehicle matching the retrieval key) on each vehicle when a plurality of vehicles satisfying the retrieval conditions by retrieval are extracted to the output unit 94. The processor 92 provided in the retrieval terminal 90 as one example of the investigation assist device extracts the traveling direction at the time when a selected vehicle respectively passes through a plurality of intersections at each intersection according to the selection of information on one vehicle among pieces of information on the respective vehicles. Accordingly, since the investigation assist system 100 can sequentially display the escape routes of the candidate vehicles of the getaway vehicles one by one even when the candidate vehicles of the plurality of getaway vehicles are extracted, it becomes possibly easy to specify and track which candidate vehicle has escaped on which escape route by presenting the displayed escape routes to the operator (for example, the policeman).

Further, the processor 92 provided in the retrieval terminal 90 as one example of the investigation assist device changes the retrieval conditions when there is no vehicle satisfying the retrieval conditions by retrieval, and retrieves at least one vehicle satisfying the changed retrieval conditions. Accordingly, for example, since the operator can slightly mitigate the retrieval conditions which are excessively narrowed at the beginning and thus adaptively change the retrieval conditions so as to approach the upper limit, the retrieval terminal 90 can easily extract the candidate vehicle of the getaway vehicle noticed by the operator through the report, and the like.

Third Embodiment

Since a configuration of an investigation assist system according to a third exemplary embodiment is the same as the configuration of the investigation assist system 100 according to the first exemplary embodiment described above, description of the same contents will be simplified and omitted, and contents different from each other will be described.

First, on the assumption of an escape direction of a candidate vehicle of a getaway vehicle that is detected to pass over a plurality of intersections generated in the investigation assist system 100 according to the second exemplary embodiment, a reproduction screen of a captured video of a situation at the time when the candidate vehicle passes through the respective intersections will be described with reference to FIGS. 21 and 22.

Figure 21:
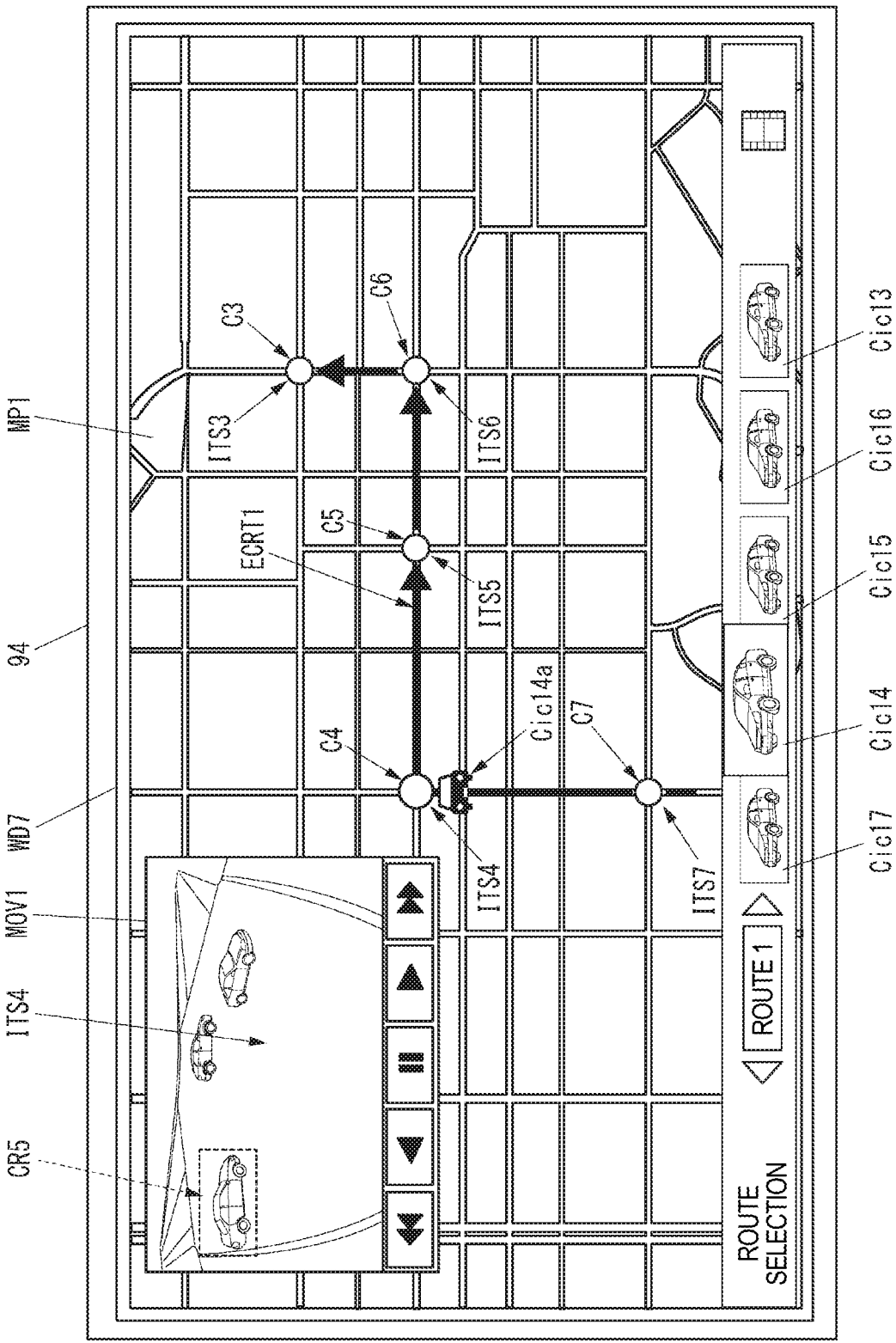
FIG. 21 is a view illustrating an example of an escape direction output screen including a video reproduction screen for reproducing a captured video when a candidate vehicle of a getaway vehicle enters a selected intersection.
Figure 22:
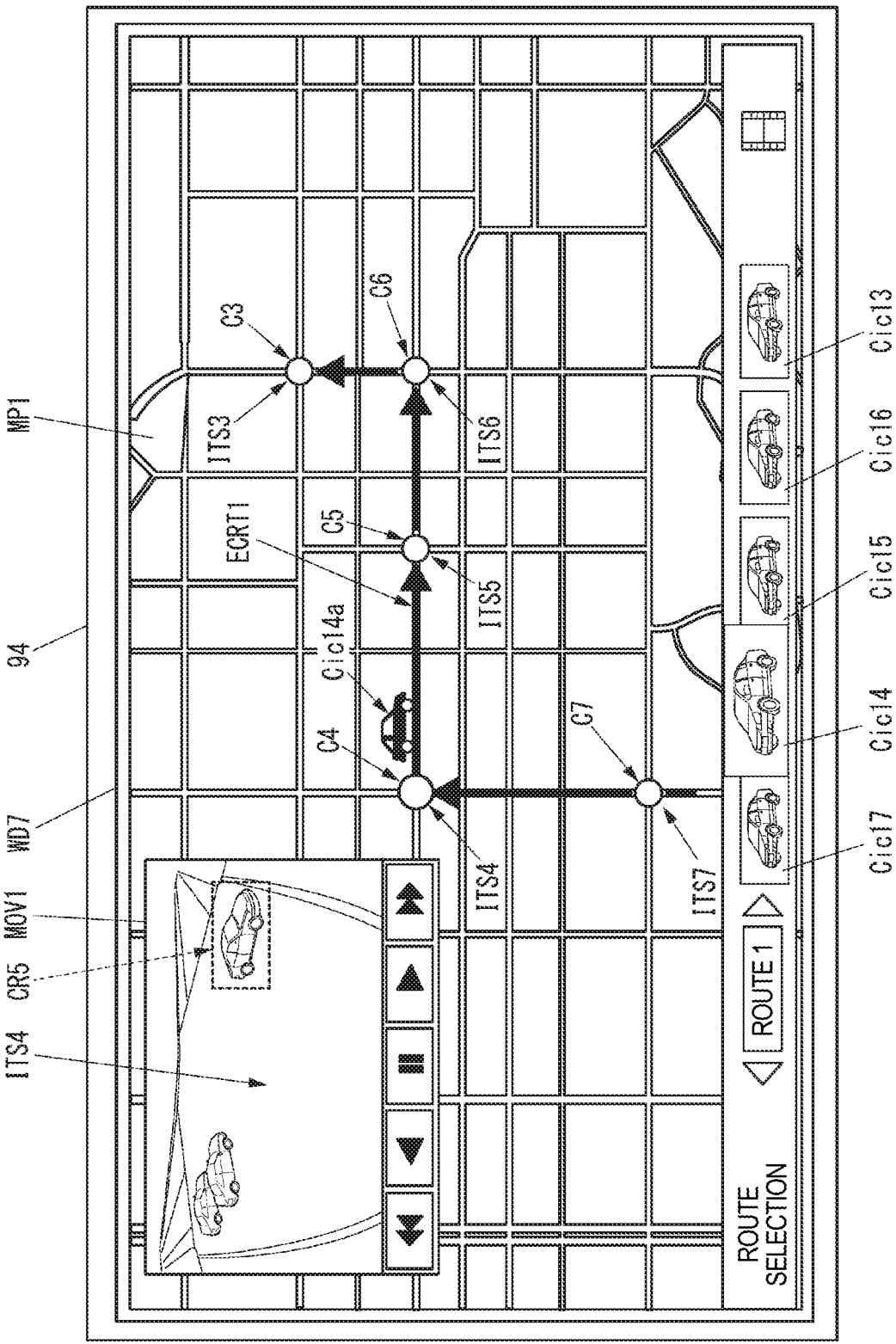
FIG. 22 is a view illustrating an example of an escape direction output screen including a video reproduction screen for reproducing a captured video when an candidate vehicle of a getaway vehicle exits a selected intersection.

FIG. 21 is a view illustrating one example of an escape direction output screen WD7 including a video reproduction screen MOV1 for reproducing a captured video at the time when a candidate vehicle of a getaway vehicle enters an intersection at a selected intersection ITS4. FIG. 22 is a view illustrating one example of the escape direction output screen WD7 including the video reproduction screen MOV1 for reproducing the captured video at the time when the candidate vehicle of the getaway vehicle leaves the intersection at the selected intersection ITS4. In the descriptions of FIGS. 21 and 22, elements overlapped with the same descriptions of FIG. 17 will be denoted with the same reference signs, the descriptions thereof will be simplified or omitted, and contents different from each other will be described.

The escape direction output screen WD7 illustrated in FIG. 21 is displayed on the output unit 94 of the retrieval terminal 90 after screen data generated as the result of the processing (refer to FIG. 18 or FIG. 20) in the recording server 50 or the cloud server 70 are transmitted to the retrieval terminal 90, for example, based on the operation of the operator (that is, the policeman) using the retrieval terminal 90 in the police station. Further, the escape direction output screen WD7 may not be generated in the recording server 50 or the cloud server 70, alternatively, the escape direction output screen WD7 may be generated by a processor of the retrieval terminal 90 (for example, the above-described dedicated application for getaway vehicle search) using the retrieval result (see the above description) from the recording server 50 or the cloud server 70. For example, the escape direction output screen WD7 is one example of a display screen of the dedicated application for getaway vehicle search previously installed in the retrieval terminal 90.

In the escape direction output screen WD7 illustrated in FIG. 21, a situation, in which a captured video of a camera C4 before a candidate vehicle CR5 of a getaway vehicle shown by an escape route ECRT1 enters an intersection ITS4 in which the camera C4 is installed from the south and tries to turn to the right is reproduced by the video reproduction screen MOV1, is illustrated. In the escape direction output screen WD7 illustrated in FIG. 22, a situation, in which a captured video of the camera C4 when the candidate vehicle CR5 of the getaway vehicle shown by the escape route ECRT1 turns to the right at the intersection ITS4 in which the camera C4 is installed is reproduced by the video reproduction screen MOV1, is illustrated.

When either one of intersections (for example, the intersection ITS4) is designated by the operation of the operator after the escape route ECRT1 is displayed (outputted) on the escape direction output screen WD7 illustrated in FIG. 17, the processor of the retrieval terminal 90 (for example, the above-described dedicated application for getaway vehicle search) generates a video request for requesting the data of the captured video of the camera installed at the designated intersection, and transmits the generated video request to the recording server 50 or the cloud server 70 through the communication unit 93. The recording server 50 or the cloud server 70 transmits (responses to) the data of the captured video of the corresponding camera (for example, the camera C4) to the retrieval terminal 90 according to the video request transmitted from the retrieval terminal 90.

The processor of the retrieval terminal 90 (for example, the above-described dedicated application for getaway vehicle search) displays the video reproduction screen MOV1 for reproducing the captured video transmitted from the recording server 50 or the cloud server 70 on the escape direction output screen WD7. Further, when detecting the candidate vehicle CR5 corresponding to the escape route ECRT1 during the reproduction of the captured video, the processor of the retrieval terminal 90 (for example, the above-described dedicated application for getaway vehicle search) may display a frame (refer to a dotted line frame in FIG. 21) for easily identifying the candidate vehicle CR5 during the reproduction thereof.

Further, the processor of the retrieval terminal 90 (for example, the above-described dedicated application for getaway vehicle search) may highlight (for example, a magnified display and blinking display) an icon (for example, an icon Cic14) corresponding to the candidate vehicle CR5 reflected on the captured video being reproduced on the video reproduction screen MOV1 and the corresponding intersection on the road map MP1, among a series of thumbnail icons Cic17, Cic14, Cic15, Cic16, and Cic13 corresponding to the escape route ECRT1 designated by the operator. Accordingly, the operator can instantly grasp whether a captured video at an intersection at a particular time of the escape route of the candidate car CR5 is reproduced on the video reproduction screen MOV1 or not.

Further, the processor of the retrieval terminal 90 (for example, the above-described dedicated application for getaway vehicle search) may display an icon Cic14*a* of the candidate vehicle CR5 reflected on the captured video being reproduced on the video reproduction screen MOV1 at a position around the intersection ITS4 on the road map MP1 (specifically, a position just before the intersection ITS4 and a position just after the intersection ITS4). Accordingly, the operator can instantly grasp which intersection corresponds to the captured video being reproduced on the video reproduction screen MOV1, and can quickly grasp a position of the candidate vehicle of the getaway vehicle.

Next, in the investigation assist system 100 according to the third exemplary embodiment, reproduction of the captured video from an entry of the candidate vehicle of the getaway vehicle at each intersection to an exit thereof will be described with reference to FIG. 23.

Figure 23:
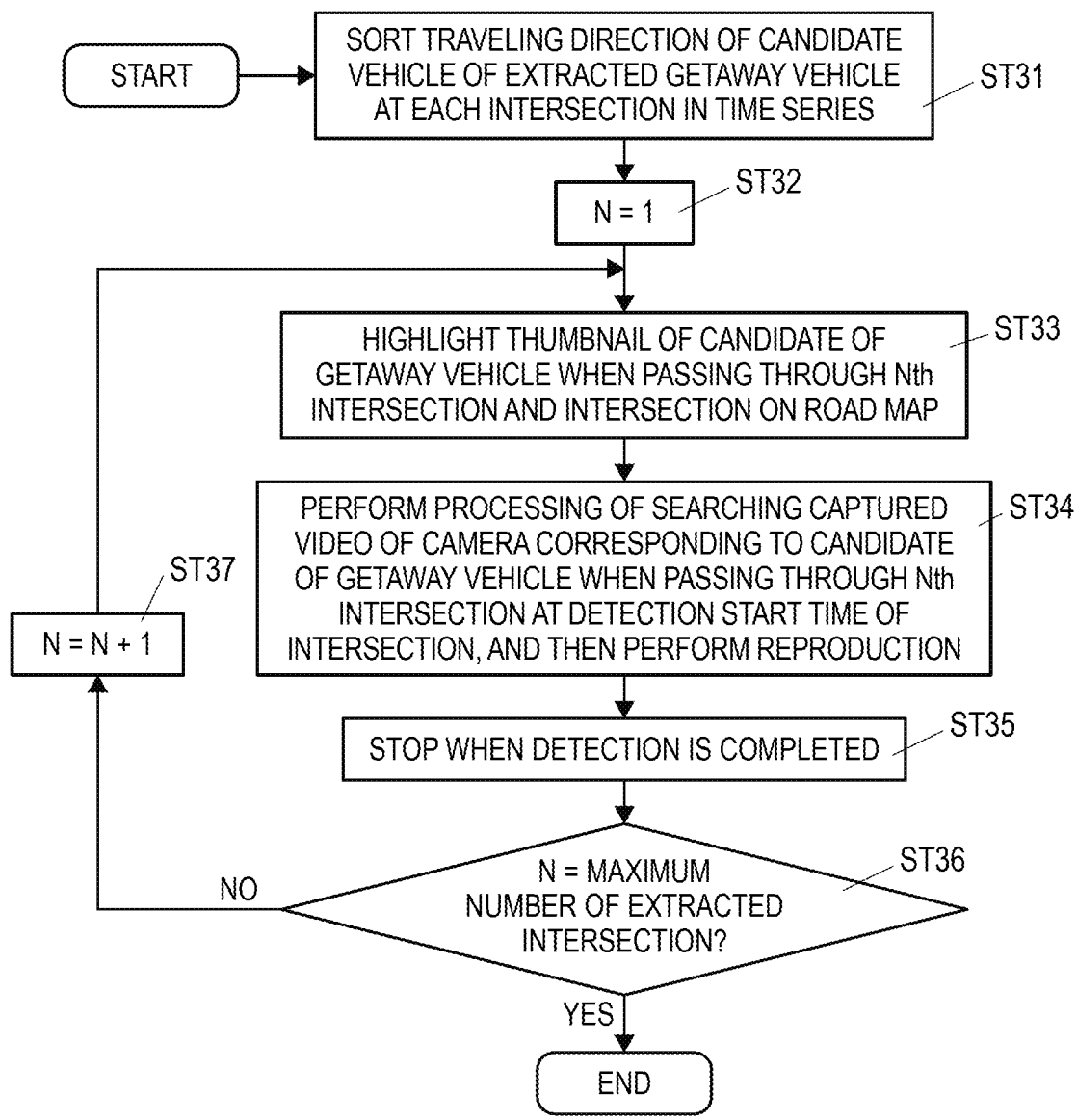
FIG. 23 is a flowchart illustrating an operation procedure of reproduction of a captured video from entry to exit for each intersection of a candidate vehicle of a getaway vehicle in a recording server and a retrieval terminal according to a third embodiment.

FIG. 23 is a flow chart illustrating an example of an operation procedure of reproducing the captured video from the entry of the candidate vehicle of the getaway vehicle at each intersection to the exit thereof in the recording server 50 and the retrieval terminal 90 according to the third exemplary embodiment.

In the following description in FIG. 23, the example executed in the recording server 50 will be described so as to simplify the description, and, alternatively, the example may be executed in the cloud server 70 in the same manner as that of the recording server 50. In that case, the recording server 50 described hereinafter may be replaced by the cloud server 70, the processor PRC1 described hereinafter may be replaced by the processor PRC2, the communication unit 51 described hereinafter may be replaced by the communication unit 71, and further, the storage unit 52 may be replaced by the storage unit 72.

Processing illustrated in FIG. 23 is executed, for example, following the processing illustrated in FIG. 18 or 20.

In FIG. 23, the processor 92 of the retrieval terminal 90 (for example, the above-described dedicated application for getaway vehicle search) sorts (that is, arranges) the traveling direction at each intersection of the candidate vehicle of the getaway vehicle extracted at step S14 or step S24 in time series at step ST31. For example, in the escape route ECRT1 illustrated in FIG. 17, it is extracted that the candidate vehicle CR5 of the getaway vehicle traveled in the order of N=5 intersections (specifically, intersections ITS7, ITS4, ITS5, ITS6, and ITS3).

The processor 92 of the retrieval terminal 90 (for example, the above-described dedicated application for getaway vehicle search) defines a parameter N indicating the number of intersections existing on the escape route ECRT1, and first sets N=1 at step ST32. Then, the processor 92 of the retrieval terminal 90 (for example, the above-described dedicated application for getaway vehicle search) generates the video request of the captured video data of the camera (for example, the camera C7) installed at an Nth (for example, N=1) intersection (for example, the intersection ITS7), and transmits the generated video request thereof to the recording server 50 through the communication unit 93. The recording server 50 transmits the captured video data of the corresponding camera (for example, the camera C7) to the retrieval terminal 90 according to the video request transmitted from the retrieval terminal 90.

Further, the retrieval terminal 90 may not request the captured video data of the camera corresponding to the recording server 50 at the time of step S32, and may acquire and hold the captured video data of the corresponding respective cameras at the time of steps S12 and S22 included in the retrieval result. In this case, it is desirable that the retrieval terminal 90 includes an intended message that the captured video data of the corresponding camera are also requested in the retrieval request to be transmitted to the recording server 50.

The processor 92 of the retrieval terminal 90 (for example, the above-described dedicated application for getaway vehicle search) highlights the thumbnail (for example, the icon Cic17) at the time when the candidate vehicle of the getaway vehicle passes through the Nth (for example, N=1) intersection, and the intersection (for example, the intersection ITS7) on the road map MP1.

The processor 92 of the retrieval terminal 90 (for example, the above-described dedicated application for getaway vehicle search) acquires the captured video data of the camera installed in the Nth (for example, N=1) intersection transmitted from the recording server 50. Further, the processor 92 of the retrieval terminal 90 (for example, the above-described dedicated application for getaway vehicle search) performs processing of searching the captured video at the time immediately before the candidate vehicle CR5 of the getaway vehicle passes through the Nth intersection (in other words, the time when the candidate vehicle CR5 starts to be detected within an angle of view of the camera installed at the intersection), and reproduces the captured video on the video reproduction screen MOV1 at step ST34.

The processor 92 of the retrieval terminal 90 (for example, the above-described dedicated application for getaway vehicle search) reproduces the captured video from detection start time of the candidate vehicle CR5 at step ST34, after which the reproduction is stopped when detection end time is reached among the captured videos of the candidate vehicle CR5 at step ST35.

After step ST35, the processor 92 of the retrieval terminal 90 (for example, the above-described dedicated application for getaway vehicle search) determines whether a current parameter N coincides with a maximum value (that is, the maximum number of intersections extracted for constituting the escape route ECRT1) of a parameter N indicating the number of intersections existing on the escape route ECRT1 or not at step ST36. When it is determined that the current parameter N coincides with the maximum value at step (ST36, YES), the processing illustrated in FIG. 23 is terminated.

Meanwhile, it is determined that the current parameter N does not coincide with the maximum value at step (ST36, NO), the processor 92 of the retrieval terminal 90 (for example, the above-described dedicated application for getaway vehicle search) performs processing of incrementing (that is, N←N+1) the current parameter N at step ST37. After step ST37, the processor 92 of the retrieval terminal 90 (for example, the above-described dedicated application for getaway vehicle search) returns to step ST33. The captured video data of the respective cameras at each intersection existing on the escape route ECRT1 are repeated and reproduced on the video reproduction screen MOV1 by the processor 92 of the retrieval terminal 90 (for example, the above-described dedicated application for getaway vehicle search) until the parameter N indicating the number of intersections existing on the escape route ECRT1 becomes the maximum value.

As described above, the investigation assist system 100 according to the third exemplary embodiment includes the plurality of cameras respectively installed at the plurality of intersections and the recording server 50 or the cloud server 70 (one example of the investigation assist device) communicably connected to the plurality of cameras. The recording server 50 and the cloud server 70 are provided with the processors PRC1 and PRC2 and the storage units 52 and 72 that record captured videos of the respective cameras in association with the capturing date, the camera information, the intersection information as well as the road map information including the plurality of intersections. The processors PRC1 and PRC2 extracts the traveling direction at the time when the vehicle satisfying the retrieval conditions respectively passes through the plurality of intersections at each intersection by using the respectively captured videos of the plurality of cameras according to the designation of the retrieval conditions including the information on the date and time when an accident, and the like occurred, and the feature information on the vehicle causing the accident, and the like. The processors PRC1 and PRC2 transmit the extracted result of the traveling direction at the time when the vehicle passes through the plurality of intersections at each intersection to the retrieval terminal 90 as one example of the investigation assist device. The processor 92 provided in the retrieval terminal 90 as one example of the investigation assist device superimposes the traveling route of the vehicle and the video reproduction screen MOV1 of the captured video at the time when the vehicle passes through the intersection on the road map MP1 and outputs the superimposed ones to the output unit 94, based on the traveling direction extracted at each intersection and the captured videos of the cameras respectively corresponding to the plurality of intersections through which the vehicle has passed.

Accordingly, the investigation assist system 100 can present the traveling route (in other words, the escape route) of the candidate vehicle of the getaway vehicle in which the person causing the accident, and the like rides and the captured video of the camera installed at the intersection existing on the traveling route to the output unit 94 in a comparative manner. Accordingly, since the operator can specifically grasp the information on the getaway vehicle known by the report, and the like with the video reproduction screen MOV1 and can grasp the escape route as well, it is possible to provide various instructions contributing to accurate initial investigation to the policeman, and the like.

The processor 92 provided in the retrieval terminal 90 as one example of the investigation assist device reproduces the captured video at the time when the vehicle passes through the intersection at each intersection on the video reproduction screen MOV1 according to the traveling route of the vehicle. Accordingly, the operator can inspect the captured video sequentially reproduced on the video reproduction screen MOV1, thereby making it possible to grasp in detail a situation of the traveling route of the candidate vehicle of the getaway vehicle when the vehicle passes through the intersection in time series.

Further, the processor 92 provided in the retrieval terminal 90 as one example of the investigation assist device highlights the corresponding intersection on the road map MP1 (for example, refer to the intersection ITS7 illustrated in FIG. 21) in synchronism with the reproduction of the captured video at the time when the vehicle passes through the intersection. Accordingly, the operator can visually and intuitively grasp that the captured video currently being reproduced on the video reproduction screen MOV1 is captured by a camera installed at a certain intersection.

Further, the processor 92 provided in the retrieval terminal 90 as one example of the investigation support assist superimposes and displays a shape frame capable of identifying the vehicle on the video reproduction screen MOV1 during the reproduction of the captured video at the time when the vehicle passes through the intersection. Accordingly, the operator can specifically and easily grasp what type of vehicle is the candidate vehicle of the getaway vehicle from the captured video being reproduced on the video reproduction screen MOV1.

Although the various embodiments have been described with reference to the drawings, the present disclosure is not limited to the embodiments. It is obvious to those skilled in the art that various changes and modifications can be made within the category described in claims, and belong to the scope of the present disclosure. Moreover, the components in the various embodiments may be arbitrarily combined without departing the scope of the present disclosure.

The present application is based upon Japanese Patent Application (Patent Application No. 2017-203930) filed on Oct. 20, 2017 and Japanese Patent Applications (Patent Application Nos. 2018-027359 and 2018-027360) filed on Feb. 19, 2018, the contents of which are incorporated herein by reference.

What is claimed is:

1. An investigation assist system, comprising:
   a plurality of cameras that are installed at a plurality of intersections, respectively and
   a terminal configured to communicate with the plurality of cameras, wherein the terminal comprises:
      a processor; and
      memory configured to store information associated with a road map including the plurality of intersections and captured videos of the plurality of cameras respectively in correspondence with a capturing time, camera information and intersection information,
   wherein the processor is configured to:
      receive, from a user, a retrieval condition including information on a date and time when an incident occurred and feature information of a vehicle causing the incident;
      identify a vehicle satisfying the retrieval condition and determine a first traveling direction of the vehicle at a first intersection of the plurality of intersections at a time when the vehicle passes through the first intersection based on the captured videos of the plurality of cameras at the plurality of intersections;
      display a retrieval result showing a plurality of vehicles including the vehicle;
      receive, from the user, a selection of the vehicle from plurality of vehicles;
      determine, based on the first traveling direction, a second intersection of the plurality of intersections, wherein the second intersection is along a traveling path of the first traveling direction of the vehicle;
      determine a second traveling direction of the vehicle at the second intersection; and
      generate a traveling route for the vehicle based on positions of the first and second intersections and the first and second traveling directions,
   wherein the processor superimposes the traveling route of the vehicle on the road map and outputs the traveling route on the road map to an output unit for law enforcement to track the vehicle.

2. The investigation assist system according to claim 1, wherein
   the processor analyzes the captured videos of the plurality of cameras at the plurality of intersections to determine whether the feature information of the vehicle is present in the captured videos of the plurality of cameras, and records analysis results in the memory.

3. The investigation assist system according to claim 1, wherein:
   receiving, from the user, a selection of the vehicle from plurality of vehicles includes receiving, from the user, a selection of a set of vehicles, including the vehicle, from plurality of vehicles;

the processor, in response to receiving the selection of the set of vehicles, determines a set of traveling directions of the set of vehicles, respectively at the first and second intersections.

4. The investigation assist system according to claim 1, wherein
when the retrieval condition is not met, the processor changes the retrieval condition.

5. An investigation assist method implemented by an investigation assist system including a plurality of cameras that are installed at a plurality of intersections respectively and a terminal that is configured to communicate with the plurality of cameras, the investigation assist method comprising:
storing information associated with a road map including the plurality of intersections and captured videos of the plurality of cameras respectively in memory in correspondence with a capturing time, camera information, and intersection information;
receiving, from a user, a retrieval condition including information on a date and time when an incident occurred and feature information of a vehicle causing the incident;
identify a vehicle satisfying the retrieval condition based on the captured videos of the plurality of cameras;
determining a first traveling direction of the vehicle at a first intersection of the plurality of intersections at a time when the vehicle passes through the first intersection based on the captured videos of the plurality of cameras at the plurality of intersections;
displaying a retrieval result showing a plurality of vehicles including the vehicle;
receiving, from the user, a selection of the vehicle from plurality of vehicles;
determining, based on the first traveling direction, a second intersection of the plurality of intersections, wherein the second intersection is along a traveling path of the first traveling direction of the vehicle;
determining a second traveling direction of the vehicle at the second intersection; and
generating a traveling route for the vehicle based on positions of the first and second intersections and the first and second traveling directions;
superimposing the traveling route of the vehicle on the road map based on the first and second traveling directions; and
outputting the traveling route on the road map to an output unit for law enforcement to track the vehicle.

6. An investigation assist system, comprising:
a plurality of cameras that are installed at a plurality of intersections, respectively; and
a terminal that is configured to communicate with the plurality of cameras, wherein the terminal comprises:
a processor; and
memory configured to store information associated with a road map including the plurality of intersections and captured videos of the plurality of cameras respectively in correspondence with a capturing time, camera information, and intersection information,
wherein the processor is configured to:
receive, from a user, a retrieval condition including information on a date and time when an incident occurred and feature information of a vehicle causing the incident;
identify a vehicle satisfying the retrieval condition and determine a first traveling direction of the vehicle at a first intersection of the plurality of intersections at a time when the vehicle passes through the first intersection based on the captured videos of the plurality of cameras at the plurality of intersections;
display a retrieval result showing a plurality of vehicles including the vehicle;
receive, from the user, a selection of the vehicle from plurality of vehicles;
determine, based on the first traveling direction, a second intersection of the plurality of intersections, wherein the second intersection is along a traveling path of the first traveling direction of the vehicle;
determine a second traveling direction of the vehicle at the second intersection; and
generate a traveling route for the vehicle based on positions of the first and second intersections and the first and second traveling directions,
wherein the processor superimposes the traveling route of the vehicle and a reproduction screen of the captured video when the vehicle passes through each of the first and second intersections on the road map, and outputs the traveling route on the road map and the reproduction screen to an output unit for law enforcement to track the vehicle.

7. The investigation assist system according to claim 6, wherein
the processor reproduces the captured video of the vehicle at the time of passing through the first and second intersections on the reproduction screen for each of the first and second intersections according to the traveling route.

8. The investigation assist system according to claim 6, wherein
the processor highlights the corresponding intersection on the road map in synchronization with the reproduction of the captured video of the vehicle at the time of passing through the intersection.

9. The investigation assist system according to claim 6, wherein
the processor displays the reproduction screen while superimposing a frame identifying the vehicle on the reproduction screen during reproduction of the captured video when the vehicle passes through the intersection.

* * * * *